United States Patent
Hsu et al.

(10) Patent No.: US 12,514,494 B2
(45) Date of Patent: Jan. 6, 2026

(54) SYSTEM AND METHOD FOR SLEEP APNEA DETECTION, COMPUTER DEVICE AND STORAGE MEDIUM

(71) Applicant: HUIJIA HEALTH LIFE TECHNOLOGY CO., LTD., Taiwan (CN)

(72) Inventors: Minghung Hsu, Taiwan (CN); Shuchen Yang, Taiwan (CN); Hsiaolung Chan, Taiwan (CN); Futai Wang, Taiwan (CN); Shihchin Fang, Taiwan (CN); Yujen Chen, Taiwan (CN); Chihhuan Liu, Taiwan (CN)

(73) Assignee: HUIJIA HEALTH LIFE TECHNOLOGY CO., LTD., Taiwan (CN)

( * ) Notice: Subject to any disclaimer, the term of this patent is extended or adjusted under 35 U.S.C. 154(b) by 1030 days.

(21) Appl. No.: 17/454,245

(22) Filed: Nov. 9, 2021

(65) Prior Publication Data

US 2022/0061753 A1    Mar. 3, 2022

Related U.S. Application Data

(63) Continuation-in-part of application No. PCT/CN2019/086435, filed on May 10, 2019.

(51) Int. Cl.
*A61B 5/00* (2006.01)
*A61B 5/087* (2006.01)
(Continued)

(52) U.S. Cl.
CPC ............ *A61B 5/4818* (2013.01); *A61B 5/087* (2013.01); *A61B 5/1114* (2013.01); *A61B 5/113* (2013.01);
(Continued)

(58) Field of Classification Search
CPC ..... A61B 5/4818; A61B 5/087; A61B 5/1114; A61B 5/113; A61B 5/7267; A61B 5/7278;
(Continued)

(56) References Cited

U.S. PATENT DOCUMENTS

| | | | |
|---|---|---|---|
| 7,371,220 B1 | 5/2008 | Koh et al. | |
| 2002/0185130 A1* | 12/2002 | Wright | A61M 16/085 |
| | | | 600/533 |

(Continued)

FOREIGN PATENT DOCUMENTS

| | | |
|---|---|---|
| CN | 204336917 U | 5/2015 |
| CN | 105769122 B | 10/2018 |

(Continued)

OTHER PUBLICATIONS

International Search Report (with English translation) and Written Opinion issued in PCT/CN2019/086435, dated Jan. 31, 2020.

*Primary Examiner* — Tse W Chen
*Assistant Examiner* — Joseph A Tombers
(74) *Attorney, Agent, or Firm* — HSML P.C.

(57) ABSTRACT

A sleep apnea detection system and a computer device are provided. The system includes a computer device configured to obtain a respiratory signal and perform data segment division on the respiratory signal to obtain a first signal segment. The first signal segment is divided into h second signal fragments and the related respiratory fluctuation is calculated. A local threshold value of first signal segments is further obtained and a third signal segment which has duration time longer than r seconds and respiratory fluctuation lower than the related local threshold value are filtered out. The ratio of time length of the third signal segments to the time length of the respiratory signal is calculated, so that the percentage of sleep apnea is obtained. The percentage of sleep apnea is substituted into a regression model which is (Continued)

well trained and an apnea-hypopnea index related to the respiratory signal is obtained.

13 Claims, 10 Drawing Sheets

(51) Int. Cl.
- *A61B 5/11* (2006.01)
- *A61B 5/113* (2006.01)
- *G16H 40/67* (2018.01)
- *G16H 50/30* (2018.01)

(52) U.S. Cl.
CPC .......... *A61B 5/7267* (2013.01); *A61B 5/7278* (2013.01); *A61B 5/742* (2013.01); *G16H 40/67* (2018.01); *G16H 50/30* (2018.01)

(58) Field of Classification Search
CPC ..... A61B 5/742; A61B 5/0024; A61B 5/0878; A61B 5/1135; A61B 5/725; G16H 40/67; G16H 50/30; G16H 50/20

See application file for complete search history.

(56) References Cited

U.S. PATENT DOCUMENTS

| | | | | |
|---|---|---|---|---|
| 2005/0020930 A1* | 1/2005 | Salisbury | ................ | A61B 5/08 |
| | | | | 600/529 |
| 2015/0157258 A1* | 6/2015 | Beattie | ................ | A61B 5/113 |
| | | | | 600/534 |
| 2016/0183846 A1* | 6/2016 | Derkx | ................ | A61B 5/1135 |
| | | | | 600/534 |
| 2016/0287122 A1* | 10/2016 | Heneghan | ............. | A61B 5/113 |
| 2020/0329978 A1* | 10/2020 | Armoundas | ........... | A61B 5/349 |

FOREIGN PATENT DOCUMENTS

| | | |
|---|---|---|
| JP | 2011-104248 | 6/2011 |
| TW | 201914525 A | 4/2019 |
| WO | 2010033849 A1 | 3/2010 |
| WO | 2017/185128 | 11/2017 |

* cited by examiner

SYSTEM AND METHOD FOR SLEEP APNEA DETECTION, COMPUTER DEVICE AND STORAGE MEDIUM

CROSS-REFERENCE TO RELATED APPLICATION

This application is a continuation-in-part of PCT patent application Serial No. PCT/CN2019/086435, with an international filing date of May 10, 2019, the contents each of which are incorporated herein by reference thereto.

TECHNICAL FIELD

The present disclosure relates to the technical field of data processing, and particularly relates to a sleep apnea detection method and a computer device.

BACKGROUND

Sleep apnea (detection of apnea) means that people stop breathing or decrease significantly during sleep. Sleep apnea is generally divided into three categories: 1. Obstructive Sleep Apnea (OSA). OSA is caused by the upper respiratory tract obstruction which is induced by the loose soft tissue near the throat, and the narrowing of the respiratory tract causes breathing to stop during sleep. 2. Central Sleep Apnea (CSA). CSA is that the central nervous system of respiratory has been damaged by strokes and traumas. Therefore, the nervous system cannot normally dedicate breathing instructions, which leads to sleep apnea. 3. Mixed Apnea. Mixed Apnea is a sleep disorder caused by mixing multiple reasons. For example, suffer from both OSA and CSA. Hypopnea refers to a significant decrease in respiratory airflow during sleep, maintaining for more than 10 seconds and accompanying with micro-arousal or decrease of blood oxygen concentration.

In implementations, the Apnea-hypopnea index (AHI) is generally used for evaluating the sleep apnea of user. The definition of AHI means the sum of the number of apneas plus the number of hypopneas that occur per hour, for the one who is under test. Specifically, AHI of a normal one is usually under 5. If AHI ranges from 5 to 15, that means the one who is under test may has mild sleep apnea. Furthermore, if the AHI falls in the range of 16 to 30, moderate sleep apnea should be considered. However, if the AHI is more than 30, the severe sleep apnea has been happened (It is to say that the medical rules are distinguishable in different nations, therefore the severe level relates to AHI may be changed with different nations. The standard which is the most suitable for AHI shall depend on the medical rules of the local nation).

Hence, for achieving the AHI monitoring of the user, the traditional tests are executed under the user falling asleep in a sleep lavatory. On the other hand, polysomnography instrument is also used simultaneously, for acquiring Polysomnography (PSG) and further calculates the AHI of the user. However, the PSG test needs to stick sensors on body or limbs of the user. It raises the inconvenience and the requirements of operating space. Moreover, this operating method may severely disturb the natural sleep of the user who is under test.

SUMMARY

Technical Problem

In light of the prior arts, the present disclosure discloses a sleep apnea detection method and computer device, therefore to solve the problem such as the dependence of environmental requirements and low efficiency due to complex operation of the traditional detection method for detecting sleep apnea.

Technical Solutions

In first aspect, the embodiment of the present disclosure provides a sleep apnea detection system, comprising a computer device. The computer device is used for collecting respiratory signal of a user when the user is in sleep, and the respiratory signal is divided into continuous first signal segments via data segments with a first preset period. The number of the first signal segments is n and n is positive integer.

The computer device is further used for dividing the first signal segments into second signal segments with number of h, and calculates related level of respiratory intensities corresponding to the second signal segments. The aforementioned h is a positive integer and $h>1$.

The computer device also acquires a local threshold value related to the first signal segments and filters out third signal segments which are constituted by the second signal segments. The duration time of the second signal segments is over r seconds and all of the related respiratory fluctuation is smaller than the local threshold value. The range of r is that $0<r<10$.

The computer device is used for further calculating duration time of the third signal segments and acquires time ratio of the third signal segments of the respiratory signal, generating percentage of sleep apnea. The percentage of sleep apnea is substituted into a regression model which is well trained, acquiring an apnea-hypopnea index related to the respiratory signal. The aforementioned regression model is used for calculating and matching the apnea-hypopnea index according to the percentage of sleep apnea.

In the second aspect of the embodiment of the present disclosure, it further provides a detecting method of sleep apnea, comprising: acquiring respiratory signal of a user and dividing the respiratory signal into continuous first signal segments with number of n via data segments with a first preset period. The number of the first signal segments is n and n is positive integer.

In further step, the method divides the first signal segments into second signal segments with number of h, and calculating related respiratory intensities corresponding to the second signal segments. The aforementioned h is positive integer and $h>1$.

Furthermore, this method acquires a local threshold value related to the first signal segments and filtering out third signal segments which are constituted by the second signal segments. The duration time of the second signal segments is over r seconds and all of the related respiratory fluctuation <the local threshold value. The range of abovementioned r is $0<r<10$.

The present method further calculates the duration time of the third signal segments and acquiring time ratio of the third signal segments of the respiratory signal, generating percentage of sleep apnea. The percentage of sleep apnea is substituted into a regression model which is well trained, acquiring an apnea-hypopnea index related to the respiratory signal. The regression model is used for calculating and matching the apnea-hypopnea index according to the percentage of sleep apnea.

In the third aspect of the embodiment of the present disclosure, it provides a computer device. The computer device comprises a storage medium (storage medium) and a processor. The storage medium stores computer-readable instructions which are executable on the processor, and the processor executes the computer-readable instructions therefore to realize following steps.

The computer device acquires respiratory signal of a user and dividing the respiratory signal into continuous first signal segments with number of n via data segments with a first preset period. The number of the first signal segments is n and n is positive integer.

The computer device divides the first signal segments into second signal segments with number of h, and calculating related respiratory intensities corresponding to the second signal segments. The abovementioned h is positive integer and h>1.

This embodiment further acquires a local threshold value related to the first signal segments and filtering out third signal segments which are constituted by the second signal segments. The duration time of the second signal segments is over r seconds and all of the related respiratory fluctuation is smaller than the local threshold value. The range of abovementioned r is 0<r<10.

At last, the present embodiment calculates duration time of the third signal segments and acquiring time ratio of the third signal segments of the respiratory signal, generating percentage of sleep apnea. The percentage of sleep apnea is substituted into a regression model which is well trained, acquiring an apnea-hypopnea index related to the respiratory signal. The regression model is used for calculating and matching the apnea-hypopnea index according to the percentage of sleep apnea.

The fourth embodiment of the present disclosure further provides a method of establishing regression model, comprising: The embodiment acquires respiratory signal of multiple users and dividing the respiratory signal into continuous first signal segments with number of n via data segments with a first preset period. The number of the first signal segments is n and n is positive integer.

The method then divides the first signal segments into second signal segments with number of h, and calculating related respiratory intensities corresponding to the second signal segments. The described h is a positive integer and h>1.

Moreover, the method acquires a local threshold value related to the first signal segments and filtering out third signal segments which are constituted by the second signal segments; wherein duration time of the second signal segments is over r seconds and all of the related respiratory fluctuation is smaller than the local threshold value. The r ranges from 0 to 10.

The method calculates the duration time of the third signal segments and acquiring time ratio of the third signal segments of the respiratory signal, generating percentage of sleep apnea of each of the multiple users.

Finally, the method acquires an apnea-hypopnea index of each of the multiple users related to the respiratory signal, and builds a linear regression equation via the percentage of sleep apnea and the apnea-hypopnea index of each of the multiple users. Therefore, the method acquires a regression model which is well trained.

In fifth aspect of the embodiment recited in the present disclosure, this application provides a computer-readable storage medium, comprising storage of computer-readable instructions. The computer-readable instructions are executed by a processor via following steps.

This embodiment acquires respiratory signal of a user and dividing the respiratory signal into continuous first signal segments with number of n via data segments with a first preset period. The number of the first signal segments is n and n is a positive integer.

The embodiment further divides the first signal segments into second signal segments with number of h, and calculating related respiratory intensities corresponding to the second signal segments. The h is positive integer and h>1.

This embodiment acquires a local threshold value related to the first signal segments and filtering out third signal segments which are constituted by the second signal segments. The duration time of the second signal segments is over r seconds and all of the related respiratory fluctuation is smaller than the local threshold value. The definition of r is 0<r<10.

The embodiment then calculates duration time of the third signal segments and acquiring time ratio of the third signal segments of the respiratory signal, generating percentage of sleep apnea. The percentage of sleep apnea is substituted into a regression model which is well trained, acquiring an apnea-hypopnea index related to the respiratory signal. At last, the regression model is used for calculating and matching the apnea-hypopnea index according to the percentage of sleep apnea.

Advantageous Effects

The suitable setting of local threshold value and the way for dividing and dealing with the respiratory signal make the related local threshold value can filter the duration time and respiratory fluctuation of the signal segment. Therefore, the signal segment which is characterized in sleep apnea can be recognized. Finally, the total time of the signal segment characterized in sleep apnea and the respiratory signal are used for calculating the duration time of sleep apnea (percentage of sleep apnea). This mechanism helps effectively quantifying sever level of the sleep apnea of users. At last, the percentage of sleep apnea acquired by the previous test and the progression model of AHI may be considered and result in the actual AHI. In other words, due the total duration time of sleep apnea/hypopnea and breathing are considered, when this application processes the apnea detection event, the fewer amount of setting of the period threshold of the respiratory fluctuation which is related to the signal segment characterized in sleep apnea makes more tolerable time for checking the sleep apnea. Therefore, this application concerns the detection effect of the embodiment of the present disclosure and reduces the interference of type of the sensors. For example, there is no longer to use contact sensor for detecting respiratory signal or use the decrease of blood oxygen saturation for detecting the apnea hypopnea event. The requirement of the environmental conditions can be significantly decreased and the numbers of sensors which are needed to be configured on users' body are reduced, too. The simplification of the traditional operation and the increased efficiency of detections can be easily observed.

DETAILED DESCRIPTION OF THE EMBODIMENTS

Figure 1:
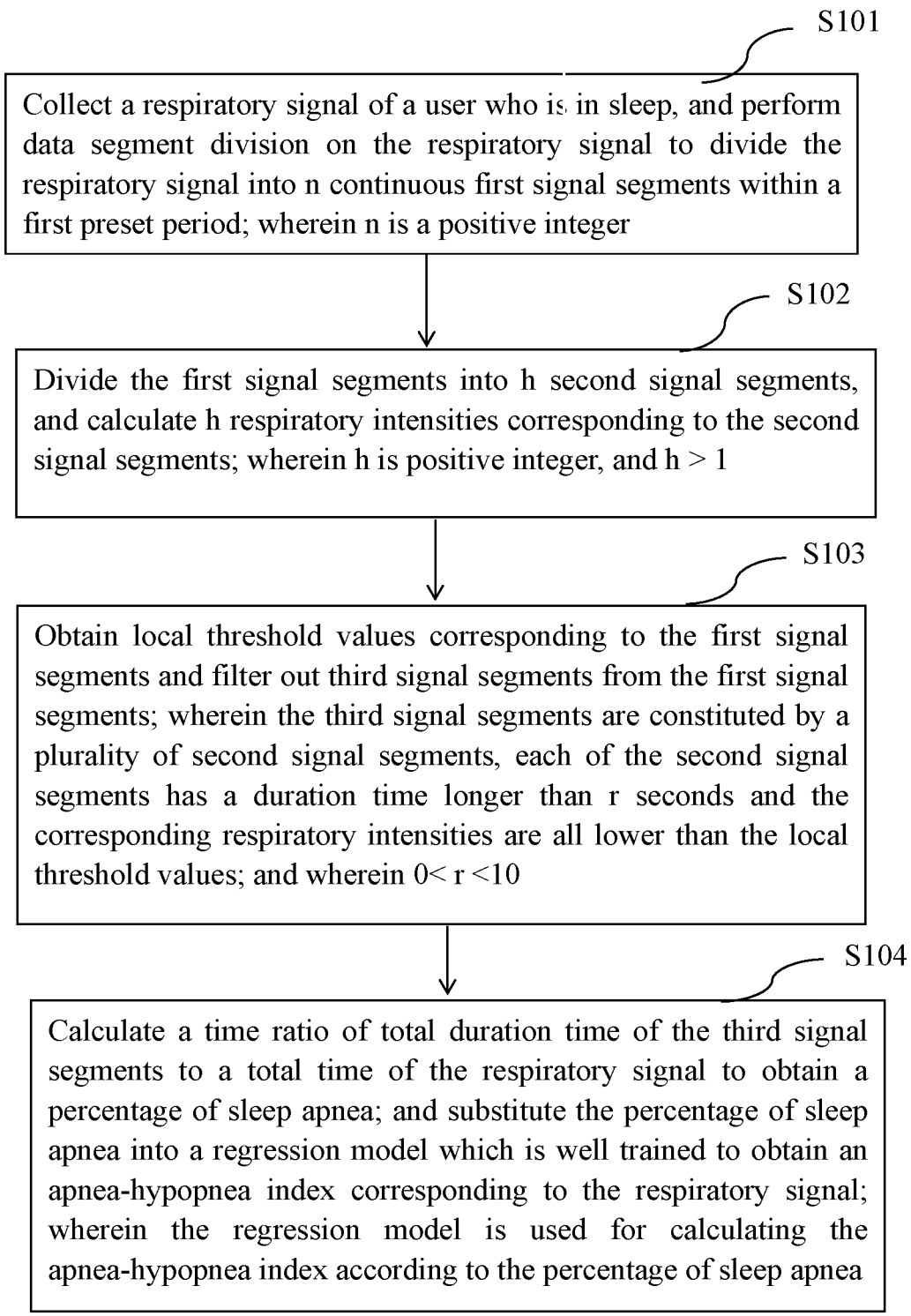
FIG. 1 is a flow chart of the computer device provided by a sleep apnea system recited in the first embodiment of the present disclosure.

In the following description, for the purpose of illustration rather than limitation, specific details such as a specific system structure and technology are proposed for understanding the embodiments of the present disclosure. However, it should be clear the skilled person in the art that the present disclosure can also be implemented in other embodiments without these specific details. In other words, detailed descriptions of known systems, devices, circuits, and methods are omitted to avoid unnecessary details from the misunderstanding of the description of present disclosure.

To realize the technical features of the present disclosure, the embodiment will be specifically described as follows.

For the reason to understand the present disclosure, this paragraph provides a brief of the embodiment of the present disclosure. Overall, in the well-known technology, PSG needs to attach direct sensors on the body of user. The requirement of the sensor and environmental condition is strict. On the other hand, this implementation also severely disturbs the sleep quality of users. Thus the sleep apnea detection of AHI has become more complicated and inefficient.

To decrease the dependence of the sensors and environmental conditions, otherwise to improve the efficiency of AHI detection, the present disclosure divides the respiratory signal into signal segments with appropriate local threshold value. The local threshold value is further used for filtering respiratory fluctuation and duration time of the signal segments, recognizing the signal segments which are characterized in sleep apnea. Simultaneously, the total duration time of the signal segments which are characterized in sleep apnea and the respiratory signal are used for calculating the ratio of duration time of the sleep apnea (the percentage of sleep apnea). This mechanism helps effectively quantifying sever level of the sleep apnea of users. At last, the percentage of sleep apnea acquired by the previous test and the progression model of AHI may be considered and result in the actual AHI. In other words, due the total duration time of sleep apnea/hypopnea and breathing are considered, when this application deals with the apnea detection event, the fewer amount of setting of the period threshold of the respiratory fluctuation which is related to the signal segment characterized in sleep apnea makes more tolerable time for checking the sleep apnea. Therefore, this application concerns the detection effect of the embodiment of the present disclosure and reduces the interference of type of the sensors. For example, there is no longer to use contact sensor for detecting respiratory signal or use the decrease of blood oxygen saturation for detecting the apnea hypopnea event. The requirement of the environmental conditions can be significantly decreased and the numbers of sensors which are needed to be configured on users' body are reduced, too. The simplification of the traditional operation and the increased efficiency of detections can be easily observed.

FIG. 1 illustrates a flow chart of the computer device provided by a sleep apnea system recited in the first embodiment of the present disclosure. Please see the description as follows.

The sleep apnea detecting system comprises a computer device.

The computer device mainly be used for the data/signal processing when the user(s) is/are sleeping at night, acquiring the AHI which is required by the embodiment of the present disclosure. Therefore, the requirements/conditions of the computer device mentioned in the embodiment of the present disclosure are only required to have the ability for analyzing the respiratory signal. For instance, the computer device may be a large calculator such as cloud server, or the small terminals such as PC or mobiles. The type of the computer device can be chosen by a person who is skilled and here is not limited. On the other hand, for foregoing and specifically realizing the computer device of the present disclosure, the ninth and the other embodiments and the descriptions thereof are suggested to be referred, unnecessary descriptions are omitted.

Specifically, the sleep apnea detection system of the present embodiment is used for processing and collecting the respiratory signal, acquiring the AHI data of the user during sleep. Hence, in the embodiment of the present disclosure, the devices, communications/transmissions between those devices or combinations thereof which are configured in this sleep apnea detection system shall satisfy the requirements of collecting, processing of the respiratory signal and thus to acquire the AHI data during sleep of user(s). In other words, in the actual practice, the limitations of data/signal transmission or the cost can be considered while the skilled person is designing the real devices, transmission between those devices or combinations thereof which are needed to be configured in the aforementioned sleep apnea detection system. The only purpose to design the sleep apnea detection system is to contain at least one of the computer device which has been recited in one of the embodiment of the present disclosure.

Description of some of the applicable combinations of the devices contained by the sleep apnea detection system of the present disclosure is described as follows.

Combination 1: The sleep apnea detecting equipment which only comprises computer device with the functions of collecting and processing.

For collecting and acquiring the respiratory signal, computer device of the embodiment of the present disclosure shall have the functions of collecting and processing data/signal simultaneously. The function of collecting data/signal can be achieved by configuring one or more sensors in the computer device. The sensors are able to be connected with the computer device via wire or wirelessly. When this embodiment needs to be used, just set a sensors on the user's body or a specific location in the environment and perform respiratory signal acquisition and processing.

Combination 2: Independent sensor+computer device, such as contact sensor/non-contact sensor+smart terminals/servers.

The independent sensors are used for acquiring the respiratory signal of user(s). The computer device processes the acquired respiratory signal and calculates the AHI. The communication and data/signal transmission between the independent sensors and the calculating are able to be realized by wire or wirelessly. For instance, the near field communication methods such as Bluetooth™ or USB devices are able to be used. However, the independent sensors are also required to have related modules therefore to receive the data/signal. On the other hand, the data transfer process can be completed via storage mediums such as the SD card, therefore to transfer the respiratory signal acquired by the independent sensors to the computer device.

Combination 3: Independent sensors+Transceiver+computer device, such as contact sensor/non-contact sensor+signal transceiver+smart terminals/servers.

Considering about the cost and the energy consumption of processing of the independent sensor which comprises wireless communication module. Specifically, if the independent sensors are used in multiple users, the cost will become unaffordable by configuring distal wireless communication module in each independent sensor. Hence, the combination 3 is proposed for solving this problem. A transceiver which is used for data/signal collecting and transferring from the independent sensor is suggested to be configured between the independent sensors and computer devices. In other words, the wireless communication module which is configured in the independent sensor can choose the low-cost and low energy consumption one such as the Bluetooth™. After acquiring the respiratory signal, the near field communication module is able to transmit the respiratory signal to the transceiver. The transceiver further transfers the respiratory signal which is collected from one or more users to the computer device.

Combination 4: Additionally extend an independent data output device based on the abovementioned combinations 1-3 such as combination 1/combination 2/combination 3+independent data output device. For example, if the combination 4 is implemented in combination 2, the component of it can be contact sensor/non-contact sensor+server+mobile terminals/PC/printers.

The final AHI data or the other data which is acquired by further processing of the AHI data are investigated by skilled person in the art or the user(s). Thus in the present embodiment of the current application, the sleep apnea detection system is able to configure an independent output device, and make the sleep apnea detection system of the present embodiment of the current application has a function of output of data independently. After the computer device finishes the calculation of AHI, the AHI data can be directly output to the independent output device and displayed. If the computer device is a server and the server has finished the calculation of AHI, the AHI data is sent to the smart phone of the user(s). The user(s) thus can check or print the AHI data via printer(s).

In combinations 1-3, several possible types of the computer device is a display function built-in computer device such as the display built-in terminal devices like smart phone, tablets or PC. Therefore, the in the embodiment of the present disclosure, the independent output device can be omitted and replaced by the computer device which has the display function per se.

It is noticed that the plurality of combinations mentioned above are only used for describing as examples of the possible embodiments of the sleep apnea detection system of the first embodiment of the present disclosure. No limitations have been made for the sleep apnea detection system of the first embodiment of the present disclosure. Those combinations can be further modified by skilled person in the art due to different requirements in the art. The only condition is that the sleep apnea detection system shall comprise the computer device of the first embodiment of the present disclosure. The other combinations which are not further listed shall be comprised in the scope of the present disclosure.

On the other hand, the every embodiments of the present disclosure, the sensors (not limited by the aforementioned contact/non-contact sensors) do not directly mean the sensing head which has functions of data collecting and acquiring. The sensor can be devices or equipment integrated sensing apparatus or modules. For instance, a wearable type device integrated by the sensing head, microprocessor and communication circuit shall be regard as the sensor mentioned in the scope of the embodiment of the present disclosure. This embodiment of the present disclosure do not specifically limit the type of the sensor(s), a skilled person in the art is allowed to choose the type of sensor(s) due to different requirements of actual needs. The contact sensor, non-contact sensor or the wearable sensor such as the bracelet/wristband are allowed to be used. Moreover, the sensor is able to be put in the specific place such as the environment around or on the body of user(s) when the user(s) is in sleep. For example, a non-contact sensor is able to be configured under the pillow or the coverlet of the bed of the user.

During the detection of sleep apnea, the computer device is used for operating the following steps.

S101, acquire respiratory signal of a user when the user is in sleep, and the respiratory signal is divided into continuous first signal segments via data segments with a first preset period; wherein the number of the first signal segments is n and n is a positive integer.

The every respiratory signal mentioned in the present invention are indicated to the respiratory signal acquired form the user(s) while the user(s) is in sleep. The respiratory signal acquired during the wake period of the user(s) or the awakening of the user(s) at night shall be discarded by the embodiment of the present invention. There are no limitations for the method of acquisition of the respiratory signal; a skilled person in the art can decide the method to use per se. The method of acquisition of the respiratory signal are comprised but not limited to the cancellation of disturbance signals via the skilled person during the waked user(s), or the skilled person is able to preset the method for detecting the user falls asleep or not, for acquiring the situation and respiratory signal of sleep. In the embodiment of the present disclosure, the respiratory signal is able to comprise snout airflow signal, pleural cavity motion signal, head-neck motion signal, dorsal thoracic motion signal or one or more signal combinations thereof. The type of the respiratory signal is decided by the type of sensor(s) which is selected by the skilled person, it is not limited thereto. As the description mentioned above, the acquiring respiratory signal of the embodiment of the present disclosure can be completed by the computer device or the independent sensor(s). It should be designed by the skilled person and not be limited thereto.

After the respiratory signal is acquired, the computer device will divide the complete respiratory signal into several first signal segments with the number of n via a first preset period, providing for the proceeding analysis. The value/term of the first preset period can be set by the skilled person. However, the value/term of the first preset period is required to be longer than 10 seconds which is longer than a sleep apnea event at once. In other words, the setting of the value/term of the first preset period may concern the validity of the proceeding detection of sleep apnea, and the number of n is determined by the total duration time of respiratory signal and the first preset period.

As an embodiment which is advantageous for representing the present disclosure, due to the recognition of the sleep apnea event is detected via the unit of the first signal segments and every first signal segment has a suitable local threshold value, the accuracy of the first signal segment used in the detection of the event of the sleep apnea event is able to be significantly increased. Therefore, the first preset period of the first signal segment is quiet important. In light of an aspect, the required value of the first preset period should be set longer than 10 seconds which is longer than a single sleep apnea event for preventing the lower value loss of detection of the sleep apnea event. However, in the other aspect, the value of the first preset period cannot be over set and it may induce the lowering validity of the local threshold value, resulting in the accuracy of detection is decreased. Hence, in the embodiment of the present disclosure, the value of the first preset period can be randomly set between 150 to 400 seconds. An example of the value of the first preset period is 300 seconds.

S102, divide the first signal segments into second signal segments with the number of h, and calculate the related respiratory intensities corresponding to the second signal segments. The h here is a positive integer and h is larger than 1.

For realizing every sleep apnea event analysis of the first signal segments, the embodiment of the present disclosure further divides the first signal segments into second signal segments which is acquired via a short term of period of time. The number of the second period is determined by the preset sampling window length of second signal segments and the shift step length of each window. For example, if the first signal segment is 300 seconds, the sampling setting of the window length is 1 second and the shift step length of each window is 1 second, too. The first signal segments is divided into the second signal period with the number of 300 and the period of time of each second signal period is 1 second. On the other hand, period of time of the shift step length of each window is able to be set quicker than each sampling window length, and the data sampling of the second signal segments will be overlapped there between. If the sampling window length is 1 second and the shift step length of each window is 0.5 second, the overlapped ratio between the sampling window length and the shift step length of each window is 50%.

When the division of the first signal segments is completed, the embodiment of the present disclosure will calculates the respiratory fluctuation of every second signal segments respectively and individually. The respiratory fluctuation means the frequency and the amplitude data of respirations produced by user(s) at a specific time. The embodiment of the present disclosure does not limit the calculation or analyzing method of the respiratory fluctuation, the skilled person can choose per se. For instance, the calculation or analyzing method of the respiratory fluctuation can use the average value of the respiratory frequency or the signal process of filters. The method recited in the second embodiment of the present disclosure can also be considered.

S103, acquire a local threshold value related to the first signal segments and filter out third signal segments which are constituted by the second signal segments. The duration time of the second signal segments is over r seconds and all of the related respiratory fluctuations are smaller the local threshold value (second segment). The range of r is 0<r<10.

After the division of respiratory signal and the calculation of the respiratory fluctuation of every first signal segment, the embodiment of the present disclosure further detects the sleep apnea event happened in the respiratory signal via the abovementioned data. Overall, the respiratory fluctuation of the respiratory signal is significantly decreased during the sleep apnea event happens, but the health conditions between different users also interfere the level of the decrease which can be observed. On the other hand, the level of severity may perform differently in different detection time. Therefore, if just set a single and constant threshold for checking the over decrease of respiratory fluctuation, the real sleep apnea detection of the user may be inaccurate and the deviation may occur. For enhancing the accuracy of the detection of sleep apnea, the embodiment of the present disclosure sets the related local threshold value for each first signal segment. Otherwise, there are local threshold values with the number of n in the embodiment of the present disclosure (the local threshold values with the number of n may be at least one part the same or distinguishable). In fact, the embodiment of the present disclosure do not limit the setting method of the local threshold value, comprising but not limiting that the skilled can set multiple local threshold values via the regular sleep period of human body or the sleep history record which is used for check the level and conditions of sleep apnea of user(s). Furthermore, the number of the first signal segments acquired in each times of the detection cannot be accurately estimated. Hence the local threshold value can be classified in different levels, and the location of actual first signal segments scattered in the respiratory signal may determine the related level of the local threshold value per se. The whole analysis between the first signal segments and respiratory signal can be processed for determining the suitable local threshold value of each first signal segment. Please refer to the related description recited in the third embodiment of the present disclosure and the further description will be omitted here.

After determining the correct local threshold values related to the first signal segments, the embodiment of the present disclosure uses the local threshold value to instantly recognize and filter out the respiratory fluctuation which is smaller than the local threshold value of the first signal segments, acquiring the data segments such as the second signal segments. Furthermore, the second signal segments which the duration time is longer than r seconds are also filtered out, therefore to become the third signal segments, and the first signal segments which are characterized in sleep apnea can be found. The value of r is able to be set by the skilled person per se. The range of r can be set between 0 and 10. Specifically, the preferred value of r is 5. It is necessary to clarify that the embodiment of the present disclosure does not detect every sleep apnea event, however to calculate the statistical situation of the signal which represents the feature of sleep apnea. On the other hand, the duration time ratio of the sleep apnea characterized signal in the respiratory signal is used for calculating the related AHI. The standard for judging the sleep apnea event is that the duration time of sleep apnea or apnea hypopnea event is over 10 seconds or not. However, the duration time of the respiratory fluctuation which is not over the threshold may be shorter than 10 seconds, and the statistics data is inaccurate. The error may happen in calculation of AHI. Therefore, in the embodiment of the present disclosure, the value of r is set to be smaller than 10, it is helpful for increasing the validity and accuracy of the embodiment of the present disclosure.

S104, calculate the duration time of the third signal segments and acquire the time ratio of the third signal segments of the respiratory signal, generating percentage of sleep apnea. The percentage of sleep apnea is substituted into a regression model which is well trained, and acquires an apnea-hypopnea index related to the respiratory signal. The regression model is used for matching and calculating the apnea-hypopnea index according to the percentage of sleep apnea.

When the filtration of third signal segment is finished from the first signal segment, the embodiment of the present disclosure will calculate the duration time ratio of the third signal segments in the total duration time of the respiratory signal which is acquired. Therefore, the percentage of sleep apnea of the embodiment of the present disclosure can be obtained without recognizing the actual sleep apnea event. In other words, this embodiment illustrates the sleep apnea event via a vague total duration time. At last, the preset percentage of sleep apnea and the regression model of AHI are used for obtaining the final AHI during the user(s) is in sleep. The regression model is built by linear regression analysis fitting via a skilled person using the percentage of sleep apnea and AHI which are related to a plurality of data segments of respiratory signal acquired from several actual users.

On the other hand, to reduce the dependence between the sensor and sensing environmental requirement and enhance the efficiency of detection of AHI, the embodiment of the present disclosure will divide the acquired respiratory signal during the sleep of user(s) at night, and suitable local threshold value will be fit to each segment of the respiratory signal. The local threshold value then be used for the respiratory fluctuation and duration time filtration of every independent signal segment and therefore to recognize the signal segments which are characterized in sleep apnea. Thereafter, the total duration time of the signal segments which are characterized in sleep apnea and the respiratory signal are used for calculating the duration time ratio of the sleep apnea (the percentage of sleep apnea), quantifying the level of severity of the sleep apnea of user(s). The human subject research proves that correlation between the AHI and percentage of sleep apnea is relatively strong. Hence, the embodiment of the present disclosure is able to use the pretested percentage of sleep apnea and the related AHI per se to build regression model, and obtains the final AHI via the regression model which has been matched. In fact, the percentage of sleep apnea is acquired by the sleep apnea/hypopnea and the duration time of sleep breathing, and the strict threshold setting for the respiratory fluctuation of the signal segment which is characterized in sleep apnea during the detection of sleep apnea event make the period of time of detection more tolerable. Thus the embodiment of the present disclosure improves the efficiency of sleep apnea detection and reduces the unstable factors to the sensors such as the detection time requirement or the type of the sensor. The detection of the respiratory signal no longer to be essential for the contact sensor, and the detection of oxygen saturation for recognizing the apnea hypopnea event can be omitted. The environmental requirements and the number of the sensors which are needed to be configured on user(s) are also reduced. The simplification and the improved efficiency of the embodiment of the present disclosure are significant, related to the traditional technology.

Figure 2:
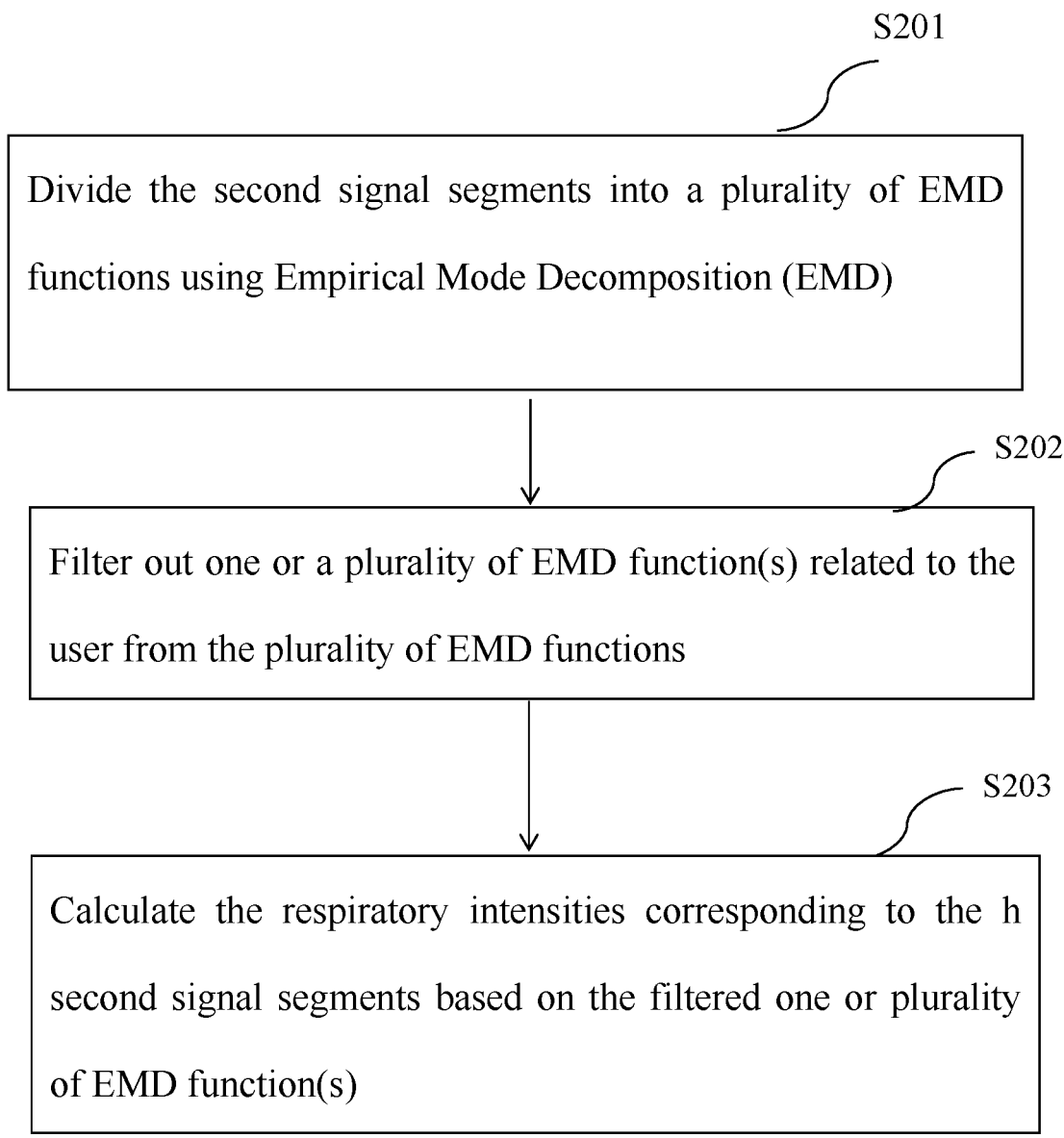
FIG. 2 is a flow chart of the calculation of respiratory fluctuation provided by a sleep apnea system recited in the second embodiment of the present disclosure.

Please refer to FIG. 2, the FIG. 2 illustrates one of the implementations of calculating the respiratory fluctuation of the embodiment of the present disclosure.

S201, the second signal segments are processed by using Empirical Mode Decomposition (EMD) and separated into a plurality of EMD functions. The EMD is to process and divide the signal segments into multiple combinations of Intrinsic Mode Function (IMF). The repeated filtration method will filter out the aforementioned Intrinsic Mode Function (IMF) step by step. For instance, the steps of filtering x(t) are briefly shown as follows:

$r1(t)=x(t)-h1(t)$        IMF1

Checking the r1(t) dose meet the conditions/requirements of the IMF. If the r1(t) does not meet the conditions/requirements of the IMF, then back to the previous step and regard the r1(t) as an original signal. The second time of filtration will be started, such as the following steps:

$r2(t)=r1(t)-h2(t)$        IMF2

$r3(t)=r2(t)-h3(t)$        IMF3

$r4(t)=r3(t)-h4(t)$        IMF4

. . .

$rm(t)=rm-1(t)-hm(t)$        IMFm

At last, the x(t) is divided into IMF with number of m and a remainder r(t) as follows:

$$x(t) = \sum_{j=1}^{n} IMF_j + r(t)$$

The breathing related signal segments filtered out from the IMF can be used for calculating the respiratory fluctuation.

S202, filter out one or more EMD function(s) related to the user(s) via the plurality of EMD functions.

S203, calculates the related respiratory intensities corresponding to the second signal segments with number h via filtered one or more EMD function(s).

The IMF1 is directed to comprise the basic signal of the respiratory signal, and the signal amplitude quickly decreases to the hyper mode form IMF2. Therefore, the previous steps of IMF are advantageous for calculating respiratory fluctuation. In fact, the previous IMF can be set and picked by skilled person in the art, no limitations hereto. It is suggested that the previous four IMF can be used for calculating the respiratory fluctuation, meaning that the square roots of the I(t) which represent the intensity point-by-point for the previous four IMF are able to be picked.

If the previous four IMF are picked, the IRI of the respiratory fluctuation related formula of Hilbert transform is as follows:

$$IRI(t) = \left(\sum_{k=1}^{4} I_k^2(t)\right)^{\frac{1}{2}}$$

In other words, if the number of the previously picked IMF such as n needs to be modified, the upper limit of sigma summation can be modified the same as n therein the formula, too.

Figure 3:
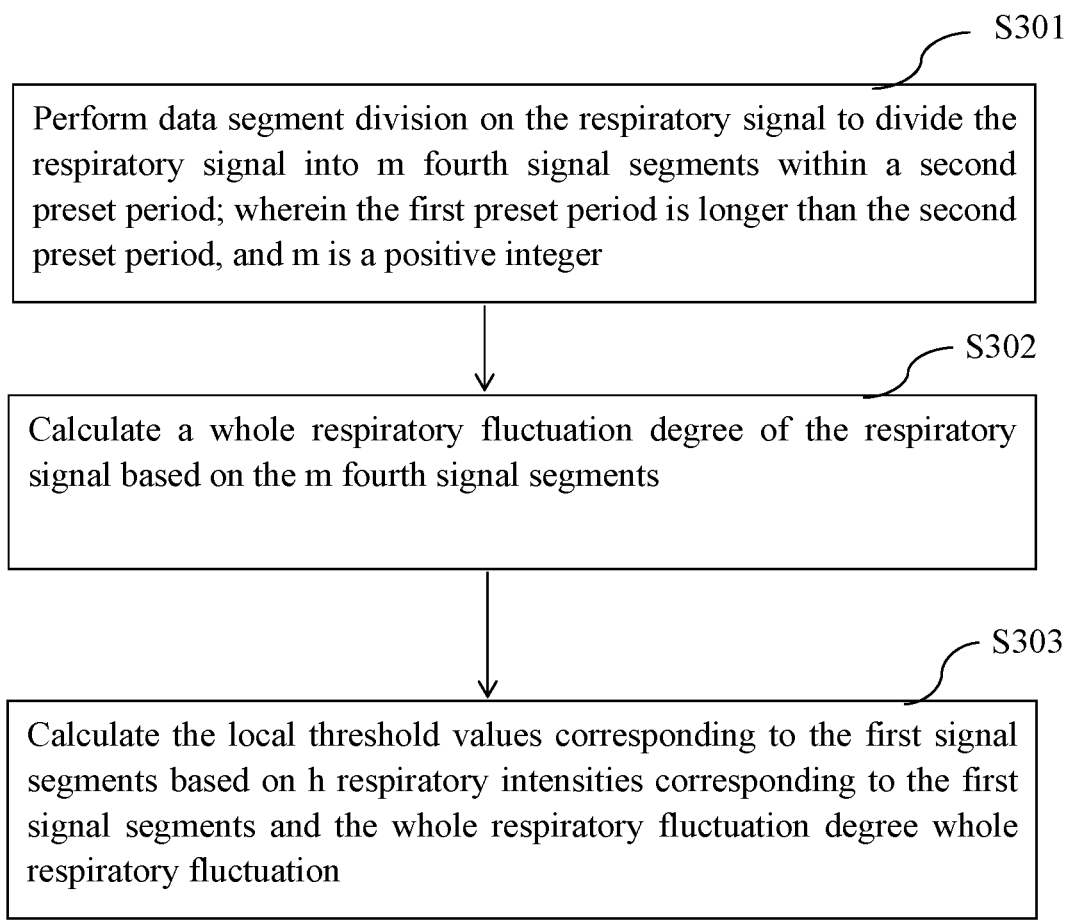
FIG. 3 is a flow chart of the calculation of local threshold value provided by a sleep apnea system recited in the third embodiment of the present disclosure.

Please refer to the third embodiment of the present disclosure recited in FIG. 3. As shown in FIG. 3, it illustrates a suitable local threshold value calculating method for the situation of first signal segments as follows.

S301, divide the respiratory signal via second preset period, acquiring fourth signal segments with number of m. The first preset period is longer than the second preset period and the m is a positive integer.

In the embodiment of the present disclosure, the fourth signal segments are mainly used for calculating the fluctuation of each parts of the respiratory signal, further concerning the level of the whole respiratory fluctuation of the aforementioned respiratory signal. Therefore, the second preset period is suggested not to be over set. Simultaneously, in order to make the differentiation (resolution) of the respiratory fluctuation analysis being larger than the first signal segments and decrease the validity of the analysis of first signal segments, the embodiment of the present disclosure is required to make sure that the second preset period is shorter than the first preset period. Specifically, if the requirement which the second preset period is shorter than the first preset period has been satisfied, the value of the second preset period can be set by a skilled person due to the real situation. It is proposed to set the value between 30 and 90 seconds (e.g. 60 seconds).

In the preferred embodiment of the present disclosure, comprising: divide the respiratory signal into the fourth signal segments with number of m via a s % overlapped data segment and terms of the second preset period. The value of s is 0<s<100.

In the embodiment of the present disclosure, when the division of the fourth signal segment is processing, the overlapped division is used. This dividing method helps the fluctuation of each part of the respiratory signal being more smooth and reliable. The value of s can be willingly set by a skilled person. The Suggested value may be 50.

S302, calculate the level of the whole respiratory fluctuation related to the respiratory signal via the fourth signal segment with number of m.

Figure 4:
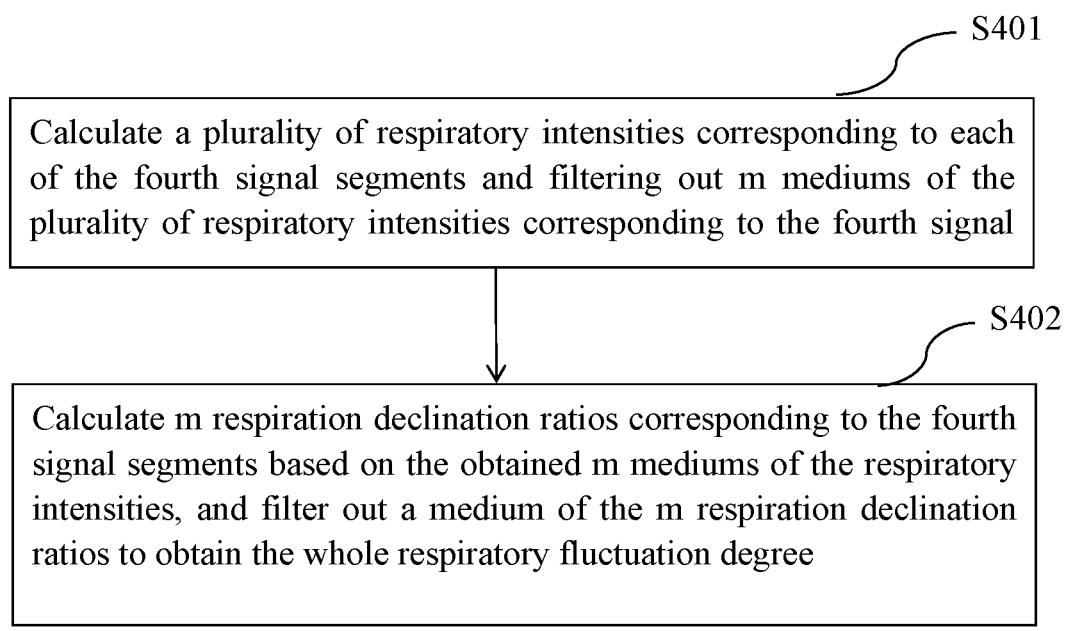
FIG. 4 is a flow chart of the calculation of the level of the whole respiratory fluctuation provided by a sleep apnea system recited in the fourth embodiment of the present disclosure.

As the fourth embodiment of the present disclosure, it regards as the level of representing globalrespiratory fluctuation. Please see FIG. 4, comprising that:

S401, calculate every fourth signal segments related to the multiple respiratory fluctuation and filter out the medium and the minimum of the respiratory fluctuation.

S402, calculate the fourth signal segment related respiratory declination ratio via the medium and the minimum of the respiratory fluctuation with number of m, and filtering out medium of respiratory declination ratio with the number of m, acquiring the level of whole respiratory fluctuation.

In the embodiment of the present disclosure, fourth signal segment is used for being a calculating unit therefore to calculate the multiple respiratory fluctuation which are comprised by the fourth signal segment per se (the dividing and calculating methods of the respiratory fluctuation is proposed to refer to the first and second embodiments of the present disclosure and the, no further description will be described herein), and prevents amplifying the fluctuation of the respiratory signal which may cause the deviation. If the noise of the signal comprises the maximum and minimum values, the embodiment of the present disclosure further takes all of the mediums of respiratory fluctuation which is related to the fourth signal as a reference value for each fourth signal segment.

After every mediums of the fourth signal segment related are concerned, the embodiment of the present disclosure will further calculate the decrease rate of the level of the whole respiratory fluctuation which is comprised by every forth signal segments. Otherwise, the difference value between the medium and the minimum of the respiratory fluctuation are calculated and further calculates the ratio of comparing this difference value with the medium of the respiratory fluctuation of the fourth signal segments. The formula is listed as follows:

$$DR=(med_{IRI}-\min_{IRI})/med_{IRI}$$

DR means the respiratory declination ratio which is related to the fourth signal segments with number of n. $med_{IRI}$ represents the $n^{th}$ medium of the respiratory declination ratio which is related to the fourth signal segments. $\min_{IRI}$ represents the $n^{th}$ minimum of the respiratory fluctuation which is related to the fourth signal segments, and $n \in [1, m]$.

Acquiring the respiratory declination ratio of each fourth signal segments, the embodiment of the present disclosure will take the medium of the respiratory declination ratio as the level of the whole respiratory fluctuation of the respiratory signal. In other words, the selection of medium is able to prevent the deviation of the over fluctuation of the respiratory signal or the interference induced by the maximum or minimum of noise. The level of the whole respiratory fluctuation changes between 0 and 1, representing the obviousness of the normal or abnormal respiratory fluctuation. Generally, the whole respiratory fluctuation of the normal user is lower than the apnea one. The embodiment of the present disclosure thus be able to represent the adaptive whole respiratory fluctuation quantization during the sleep of user(s).

On the other hand, combining with the fourth embodiment of the present disclosure and the overlapped division of the fourth signal segments mentioned above, the acquired respiratory fluctuation will become more smooth and make the time resolution of the respiratory declination ratio much higher and accurate. The validity of the final local threshold value is raised simultaneously, too.

S303, calculate local threshold values which is related to each first signal segment via the respiratory fluctuation which is related to every first signal segment with number of h and the level of the whole respiratory fluctuation.

When the quantified result of the respiratory fluctuation of the user has been acquired during sleep, the embodiment of the present disclosure further considers the fluctuation situation therefore to combine the actual respiratory fluctuation of every first signal segment, concerning the local threshold value of each first signal segment. The adaptive setting of the local threshold value per se thus accomplished.

Specifically, the local threshold value of the first signal segment is obtained via calculating the cross product of the mode of the respiratory fluctuation which is related to the first signal segments with the number of h and the level of the whole respiratory fluctuation.

Moreover, the local threshold value of the first signal segment is obtained via calculating the cross product of the medium of the respiratory fluctuation which is related to the first signal segments with the number of h and the level of the whole respiratory fluctuation. The selection of medium mentioned here also prevents the deviation caused by the over fluctuation of respiratory signal and the interference of the maximum and minimum of the noise happened in signal.

The method for calculating local threshold value can be set by a skilled person. In the embodiment of the present invention, the selection of the medium of the respiratory fluctuation with the number of h and the level of the whole respiratory fluctuation is preferred and suggested.

Though the medium of the respiratory fluctuation in some part of the sleep apnea event is relatively not obvious, however the level of the whole respiratory fluctuation of the one who is under the sleep apnea test is more obvious. The local threshold value is able to be adjusted to the appropriate value. On the contrary, in the part without the sleep apnea event, the partial medium of the respiratory fluctuation is more obvious, but the respiratory fluctuation of the normal one who is under test represents not obvious. Therefore, the local threshold value calculated via the aforementioned cross product is good at filtering out the data segments which are characterized in sleep apnea of the first signal segments, and concerning the adaptive setting of the local threshold value per se. Though the situation between different users is not the same, or the user may change the body position or posture during they are sleeping, the local threshold value of the embodiment of the present invention is able to adaptively adjust itself dynamically, confirming the validity and accuracy of the local threshold value.

As an actual combination recited in one of the first embodiment of the present disclosure, the calculator comprises the contact sensor or non-contact sensor such as the combination 1 mentioned in the first embodiment.

As the description of the embodiment of the present disclosure, the present disclosure uses the percentage of sleep apnea to quantify the level of severity of the user(s) during sleep. The actual detection of sleep apnea event is omitted, reducing the dependence of the type of sensor and the environmental requirement for sensing. Therefore, in the embodiment of the present disclosure, the respiratory signal is snout airflow signal, pleural cavity motion signal, head-neck motion signal, dorsal thoracic motion signal or one or more signal combinations thereof. On the other hand, the contact sensor and the non-contact sensor comprise:

The contact sensor is used for collecting the snout airflow signal and/or pleural cavity motion signal when the user is in sleep.

The non-contact sensor is used for collecting the head-neck motion signal and/or dorsal thoracic motion signal when the user is in sleep.

The contact sensor comprises but not limited to optical fiber mouth-nose patch, thermal and air-flow sensor which are attached on/inside the nose and mouth, or the resistive and inductive sensing straps which are tied to the chest and abdomen potion. The non-contact sensor comprises but not limited to optical fiber sensor, air bag sensor, piezoelectric film sensor, load cell or capacitive sensor thereof. The type of the sensor can be determined by skilled person.

In the same time, when the contact sensor is working, the working positions can be configured in different places of user's body, considering about the type of the respiratory signal which is needed to be acquired. For instance, the snout airflow signal is able to be detected on the nose, mouth or snout portion of the user. Sensors tied to the chest and abdomen portion are used for sensing the motion signals of the chest, abdomen or pleural cavity. The non-contact sensor can be configured on/in specific location around the user, therefore to detect/sense the essential type of respiratory signal. For instance, the sensor which is configured inside the pillow that is able to sense the head-neck motion signal. On the contrary, the sensor configured under the bed or the coverlet per se is used for detecting dorsal thoracic motion signal.

As another actual combination of the sleep apnea detection system of the first embodiment of the present disclosure, the aforementioned sleep apnea detection system further comprises contact or non-contact sensors which are independent from the calculation device, such as the combination 2 or 3 mentioned in the first embodiment of the present disclosure.

As the description of the embodiment of the present disclosure, the present disclosure uses the percentage of sleep apnea to quantify the level of severity of the user(s) during sleep. The actual detection of sleep apnea event is omitted, reducing the dependence of the type of sensor and the environmental requirement for sensing. Therefore, in the embodiment of the present disclosure, the respiratory signal is snout airflow signal, pleural cavity motion signal, head-neck motion signal, dorsal thoracic motion signal or one or more signal combinations thereof. On the other hand, the contact sensor and the non-contact sensor comprise:

The contact sensor is used for collecting the snout airflow signal and/or pleural cavity motion signal when the user is in sleep, and the acquired snout airflow signal and/or pleural cavity motion signal are transferred to the computer device.

The non-contact sensor is used for collecting the head-neck motion signal and/or dorsal thoracic motion signal when the user is in sleep, and the acquired head-neck motion signal and/or dorsal thoracic motion signal are transferred to the computer device.

The description of the contact or non-contact sensor are omitted therein, the related description can be referred to the description of the last embodiment. In the embodiment of the present disclosure, in order to sensor is independent from the computer device, the usage of sensor become more flexible for collecting data or signal, widening the fields that can be used for detection of sleep apnea for user(s). The contact or non-contact sensors are also can be designed as the form such as wrist ring or bracelet. When the collecting work of respiratory signal is operating, the complicated sensor configuration can be avoided and the operation will be effective and convenient.

As an actual embodiment of the present disclosure and considering about the high sensitivity of optical fiber sensor, after numerous human test, it has been found that the deformation of the optical fiber sensor configured inside the pillow can detect and acquire the respiratory vibration appeared in head-neck portion. The decreased percentages of the deformation of the optical fiber sensor range from 66.6% to 40.2%, 40.2% to 24.9%, and 24.9% to 0.01% respectively. Those decreased percentages of the deformation represent CSA, OSA, hypopnea and normal respectively. On the other hand, the optical fiber sensor embedded in mattress does collect the motion signal of pleural cavity. The decreased percentages are 73.1%, 27.3%, 19.4% and 0.01%, and those percentages represent CSA, OSA, hypopnea and normal respectively. The statistics meanings are similar to the decrease level of thoracic strap signal. Hence, the embodiment of the present disclosure configures the optical fiber sensors via two ways such as inside the pillow or under the coverlet of bed of the user(s) respectively. Thus the optical fiber sensors are able to collect the head-neck motion signal and dorsal thoracic motion signal simultaneously. The optical fiber sensor mentioned here is able to be a part of hardware of the calculation device or an equipment/apparatus independent from the computer device.

The aforementioned optical fiber sensor can alternatively comprises 4th order anti-causal Butterworth high-pass filter and further enhance the signal with a cut-off frequency of 0.1 Hz.

As another actual combination of the sleep apnea detection system of the embodiment of the present disclosure, in the embodiment of the present disclosure, the sleep apnea system further comprises a display which is independent from the computer device such as the combination 4 mentioned in the first embodiment of the present disclosure, comprising:

The computer device further transfers the AHI to the display.

The display is used for displaying the AHI which has been received.

In another embodiment of the present disclosure, the computer device is used for processing the respiratory signal and calculating AHI. The display of AHI is non-essential. In order to the display of AHI is omitted to the user(s), the convenience of portability of the computer device is significantly raised and the computer device of the embodiment of the present disclosure can be powerful processing equipment/apparatus such as the cloud server. The processing speed and efficiency of the respiratory signal is much higher and realize the multitasking processing of the respiratory signals from several users simultaneously. On the other hand, the results of processing of the respiratory signals also can be output to different displays and be reported. The processing efficiency of the current embodiment is proven again.

As an actual combination of the sleep apnea detection system of the first embodiment of the present disclosure, in this embodiment of the present disclosure, the computer device further comprises a display, comprising:

The display is used for displaying and outputting the AHI.

In the embodiment of the present disclosure, the computer device can directly display the acquired AHI. Thus this embodiment is suitable for the terminal user(s). For example, the smart terminals such as the smart phone or tablets can process and report the respiratory signal per se, avoiding the connection of remote server thus to realize the self-detection and self-monitoring of the sleep apnea.

Figure 5:
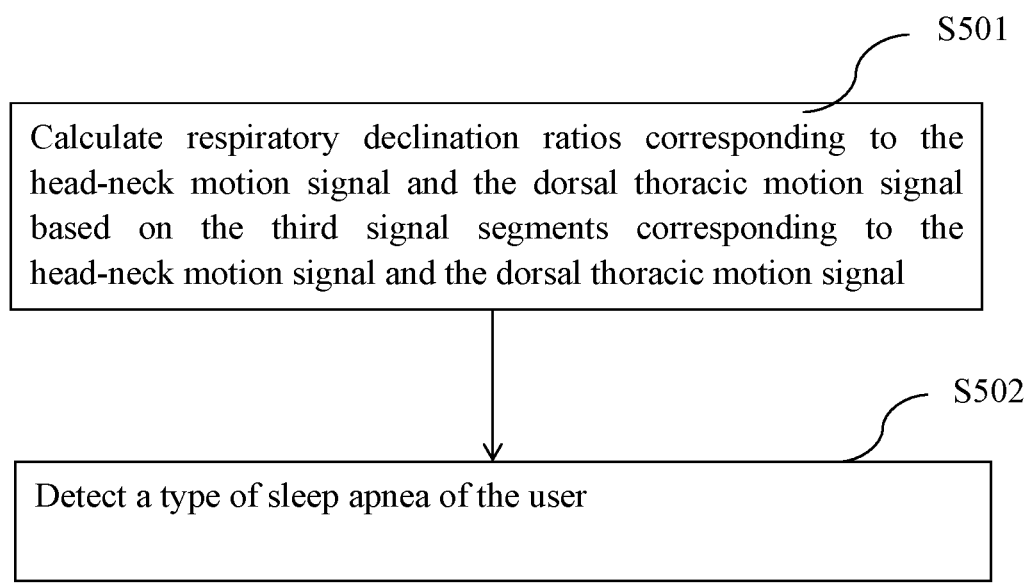
FIG. 5 is a flow chart of the detection of type of the sleep apnea provided by a sleep apnea system recited in the fifth embodiment of the present disclosure.

The fifth embodiment of the present disclosure is used for recognizing the type of the sleep apnea. In this embodiment of the present disclosure, the respiratory signal comprises: the head-neck motion signal and the dorsal thoracic motion signal. Please refer to FIG. 5. As shown in FIG. 5, it comprises:

S501, the computer device uses the head-neck motion signal and the dorsal thoracic motion signal related third signal segments for calculating the respiratory declination ratio(s) related to the head-neck motion signal and the dorsal thoracic motion signal respectively.

S502, recognize the type of sleep apnea of user(s) via the respiratory declination ratio(s).

The OSA and CSA both results in sleep apnea of user(s). However, the dorsal thoracic motion signal will be represented obviously in OSA rather than CSA, due to the theory of OSA. Therefore, the third signal segment which is characterized in representing the sleep apnea event can be used for recognizing the change of the movements of the dorsal thoracic of the user(s) when the sleep apnea is happening. It is great for recognizing these two types of sleep apnea. Specifically, the embodiment of the present disclosure will individually calculates the respiratory declination ratio(s) of the head-neck motion signal and the dorsal thoracic motion signal via the third signal segments, and further judges the respiratory declination ratio(s) of these two type of signal is over the threshold or not. If both of the types of the signal are over the threshold, it represents that the movements of dorsal thoracic of the user(s) are obvious, too. The CSA will be confirmed. However, if the respiratory decreasing signal related to head-neck motion signal is more obvious than the dorsal thoracic motion signal, the type of OSA will be confirmed. The threshold mentioned can be set freely by a skilled person.

Furthermore, the ratio between two types of the respiratory declination ratio(s) are able to be calculated and the value of the calculated ratio is able to be used for recognition of type of sleep apnea. If the value of the calculated ratio is small, it represents that the respiratory declination ratio(s) of them are similar, the CSA will be confirmed. On the contrary, if the calculated ratio is large, the respiratory declination ratio(s) of them are distinguishable and the OSA will be confirmed simultaneously.

As an alternative embodiment of the present disclosure, the sleep apnea detection systems of the abovementioned embodiments of the present disclosure further connect to the respiratory treatment equipment. When the hyper-AHI of user(s) is/are detected, the respiratory treatment equipment works immediately and rescues the user(s). For example, the respiratory therapy equipment such as vibrator or CPAP can be connected with the sleep apnea detection system. The respiratory therapy equipment is activated to rescue the user(s) when the hyper-AHI of the user(s) is/are detected.

For reducing the dependence of the sensing environment and increasing the efficiency of detecting AHI, the embodiment of the present disclosure will divide the acquired respiratory signal during the sleep of user(s) at night, and suitable local threshold value will be adaptively fit to each segment of the respiratory signal. The local threshold value then be used for the respiratory fluctuation and duration time filtration of every independent signal segment and therefore to recognize the signal segments which are characterized in sleep apnea. Thereafter, the total duration time of the signal segments which are characterized in sleep apnea and the respiratory signal are used for calculating the duration time ratio of the sleep apnea (the percentage of sleep apnea), quantifying the level of severity of the sleep apnea of user(s). Hence, the embodiment of the present disclosure is able to use the pretested percentage of sleep apnea and the pre-calculated AHI to build a regression model, and obtains the final AHI via the regression model. In order to the respiratory declination ratio is considered via the respiratory fluctuation, when calculating the duration time of the signal segments which are characterized in sleep apnea/hypopnea and detecting the sleep apnea event, the strict threshold setting for the respiratory fluctuation of the signal segment which is characterized in sleep apnea during the detection of sleep apnea event make the period of time of detection more tolerable. Thus the embodiment of the present disclosure improves the efficiency of sleep apnea detection and reduces the unstable factors or dependences to the sensors such as the detection time requirement or the type of the sensor. The detection of the respiratory signal no longer to be essential for the contact sensor, and the detection of oxygen saturation for recognizing the apnea hypopnea event can be omitted. The environmental requirements and the number of the sensors which are needed to be configured on user(s) are also reduced. Simultaneously, when the adaptive calculation of the local threshold value of each first signal segment is processing, and the situation between different users is not the same or the user may change the body position or posture during they are sleeping, the local threshold value of the embodiment of the present invention is able to adaptively adjust itself dynamically, confirming the validity and accuracy of the local threshold value. The validity of AHI is more reliable after the practical test. In contrast with the traditional technology, the embodiment of the present disclosure is significantly simplified and the detection efficiency is obviously improved.

Figure 6:
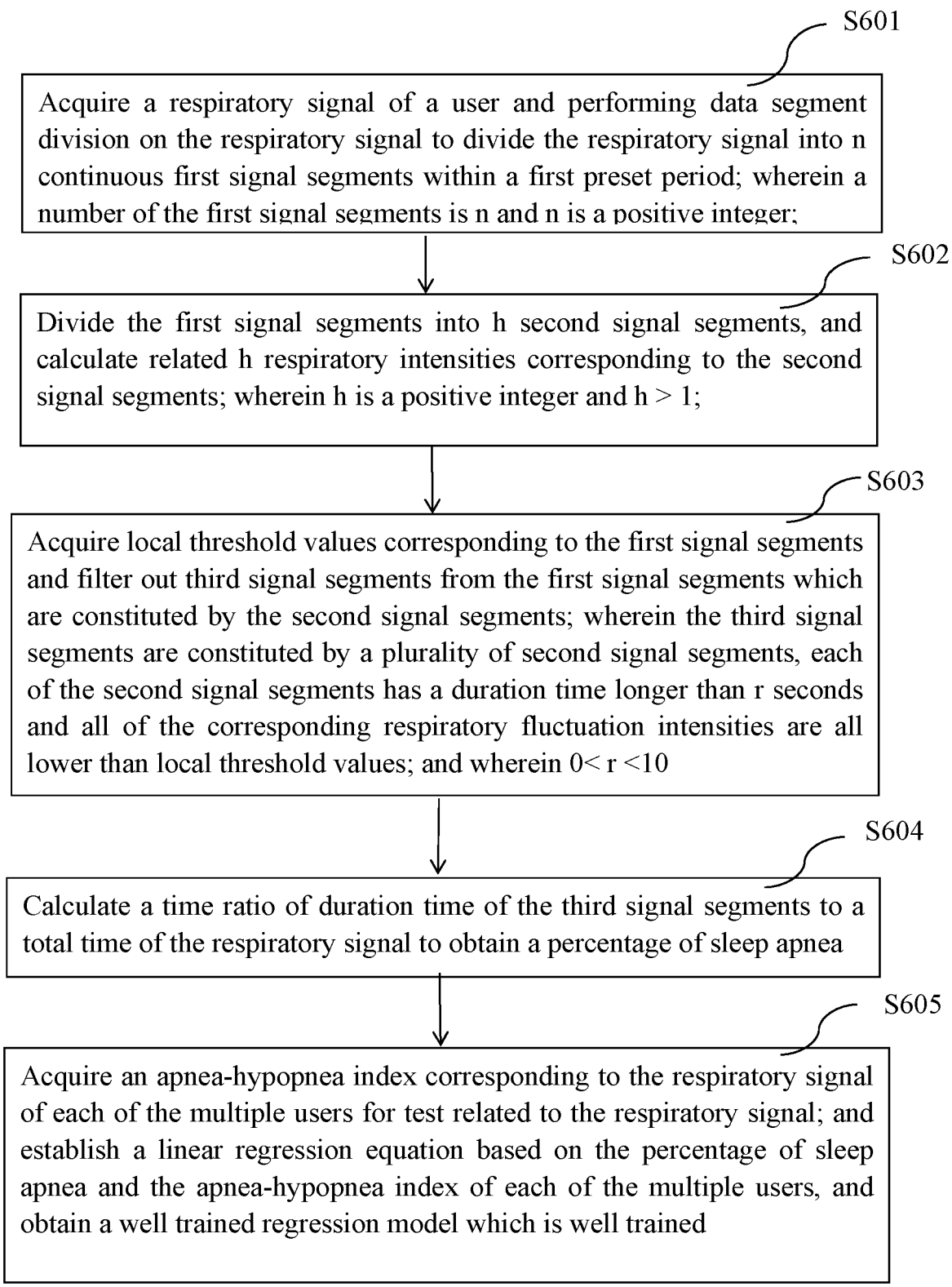
FIG. 6 illustrates a flow chart describing the establishment of regression model in the sixth embodiment of the present disclosure.

As the sixth embodiment of the present disclosure, for establishing an AHI regression model based on calculation of percentage of sleep apnea and realizing the abovementioned embodiments of the present disclosure. Before the sleep apnea detection system of the embodiment of the present disclosure calculates the AHI of user(s), the embodiment of the present disclosure will pre-build the regression model as shown in FIG. 6, comprising:

S601, acquire respiratory signal of during the sleep of multiple users and divide the respiratory signal into continuous first signal segments with number of n via data segments with a first preset period. The number of the first signal segments is n and n is a positive integer.

S602, divide the first signal segments into second signal segments with number of h, and calculate related respiratory intensities corresponding to the second signal segments. The h is a positive integer and h>1.

S603, acquire a local threshold value related to the first signal segments and filter out third signal segments which are constituted by the second signal segments. The duration time of the second signal segments is over r seconds and all of the related respiratory fluctuation is smaller than the local threshold value. The r ranges from 0 to 10.

S604, calculate duration time of the third signal segments and acquiring time ratio of the third signal segments of the respiratory signal, generating percentage of sleep apnea of each user.

S605, acquire an apnea-hypopnea index of each of the multiple users related to the respiratory signal and build a linear regression equation via the percentage of sleep apnea and the apnea-hypopnea index of each of user, and acquire a regression model which is well trained.

The theories of steps from S601 to S604 are basically the same as the first embodiment to the fifth embodiment of the present disclosure. The descriptions of them are able to be referred, further description is omitted. In this embodiment of the present disclosure, the respiratory signal of multiple users will be collected. The respiratory signal will be processed as the same as of the methods recited in the first embodiment to the fifth embodiment of the present disclosure, therefore to acquire the percentages of sleep apnea related to each user. On the other hand, the sleep medicine experts estimate the real AHI via the detected respiratory signal and obtaining the regression model for calculating AHI via the aforementioned two types of data.

If the number of types of the respiratory signal are different, the differentiation between the embodiments of the present disclosure will be distinguishable. If the original number of type of the respiratory signal which used for the detection of sleep apnea is only one, the general formula of regression model equation is as follows:

$$AHI = \alpha PTDPD + \beta$$

If the number of types of the respiratory signal which used for the detection of sleep apnea is two, the general formula of regression model equation is shown as follows:

$$AHI = \alpha 1 PTDPD1 + \alpha 2 PTDPD2 + \beta 1$$

The increased number of types of the respiratory signal which used for the detection of sleep apnea can be thereafter referred by this order.

The PTDPD is substituted by percentage of sleep apnea. The $\alpha$, $\alpha 1$, $\alpha 2$, $\beta$ and $\beta 1$ are the constants which are obtained via the fitting of the linear regression.

The table 1 shows the different types of respiratory signal which are collected by head-neck optical fiber sensor, dorsal thoracic optical fiber sensor, thermal sensor of nose, chest strap or the combinations thereof from the user(s) in test environment. These respiratory signals are fitted via linear regression therefore to obtain the AHI regression equation of the percentage of sleep apnea.

TABLE 1

| Type of sensor | Regression Equation |
| --- | --- |
| Head-neck optical fiber sensor | $AHI = \alpha PTDRD1 + \beta$<br>$\alpha \in (2, 3)$, $\beta \in (1, 2)$<br>Suggested value: $\alpha = 2.4266$, $\beta = 1.5211$ |
| Dorsal thoracic optical fiber sensor | $AHI = \alpha PTDRD2 + \beta$<br>$\alpha \in (1.7, 2.7)$, $\beta \in (1.8, 2.8)$<br>Suggested value: $\alpha = 2.2103$, $\beta = 2.3827$ |
| Head-neck optical fiber sensor & Dorsal thoracic optical fiber sensor | $AHI = \alpha_1 PTDRD1 + \alpha_2 PTDRD2 + \beta_1$<br>$\alpha_1 \in (0, 1)$, $\alpha_2 \in (1, 2)$, $\beta_1 \in (0, 1)$<br>Suggested value: $\alpha_1 = 0.7313$, $\alpha_2 = 1.7964$, $\beta_1 = 0.8681$ |
| Thermal sensor of nose | $AHI = \alpha PTDRD3 + \beta$<br>$\alpha \in (1.5, 2.5)$, $\beta \in (4.5, 5.5)$<br>Suggested value: $\alpha = 2.0301$, $\beta = 5.0245$ |
| Chest strap | $AHI = \alpha PTDRD4 + \beta$<br>$\alpha \in (1.5, 2.5)$, $\beta \in (1.5, 2.5)$<br>Suggested value: $\alpha = 2.0252$, $\beta = 2.0132$ |
| Thermal sensor of nose & Chest strap | $AHI = \alpha 1 PTDRD3 + \alpha 2 PTDRD4 + \beta 1$<br>$\alpha 1 \in (0.7, 1.7)$, $\alpha 2 \in (0.5, 1.5)$, $\beta 1 \in (2.7, 3.7)$<br>Suggested value: $\alpha 1 = 1.2436$, $\alpha 2 = 0.9724$, $\beta 1 = 3.2726$ |

The deviation of the real signal data processing or the regression equation may exists in order to the difference between the environmental conditions and distinguishable users. However, the deviation shall be comprised by the scope of the present disclosure.

Figure 7:
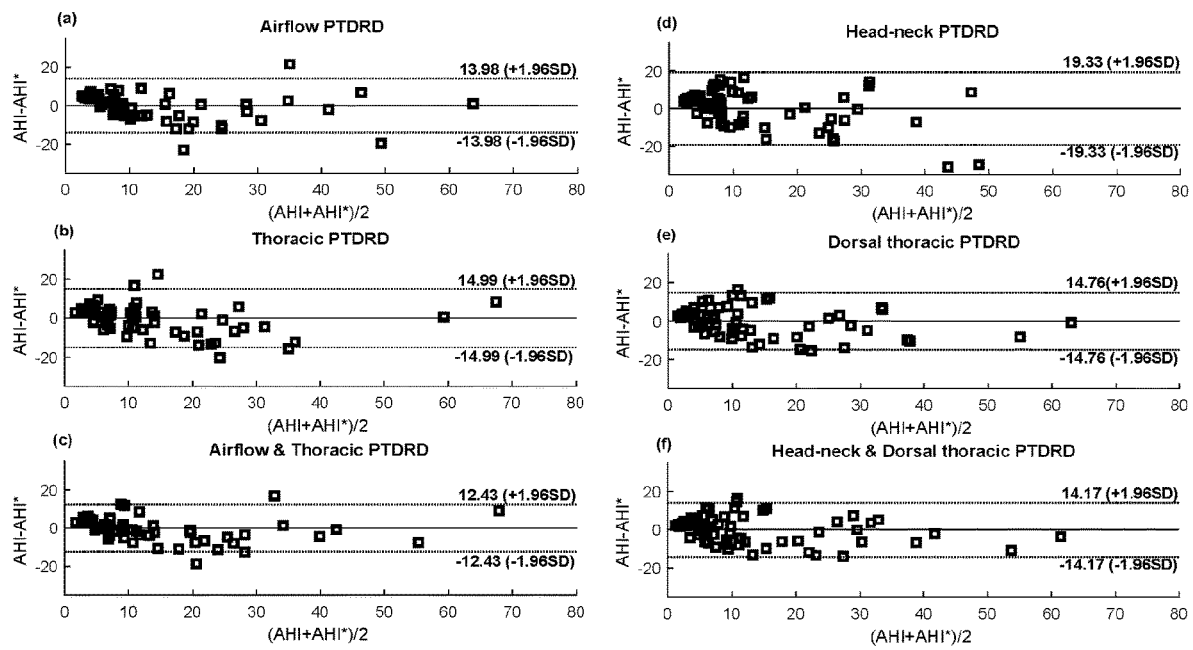
FIG. 7 is a Bland-Altman difference plot of the AHI provided by the sixth embodiment of the present disclosure.

The regression equations recited in table 1 are used for analyzing Bland-Altman difference plot of the AHI, therefore to fit the constant values between the sleep medicine experts and the suggested values recited in table 1. As shown in FIG. 7, the FIG. 7 shows the Bland-Altman difference plot of the AHI of table 1.

The model snout air-flow (a, c) illustrates the narrowest range of $LOA$, it means that the estimated/calculated AHI is almost the same as the AHI estimated by sleep medicine experts. Moreover, the $LOA$ range which represents narrower in the regression of AHI of the head-neck optical fiber sensor (d) and the dorsal thoracic optical fiber sensor (e).

In FIG. 7, the regression models of table 1 of the Bland-Altman difference plot of the AHI estimated by sleep medicine experts and the estimated AHI (AHI*) is represented by second line of three lines such as the mean difference (AHI-AHI*). On the other hand, the upper and the lower limits of 95% fitness between them are represented by the first and the third line.

In this research, the limited fitness of the Bland-Altman difference plot shows that the embodiment of the present disclosure which uses the AHI of percentage of sleep apnea can collect signals via several types of sensors, and the result of the acquired AHI almost fits to the AHI estimated by sleep medicine experts, thus prove the embodiment of the present disclosure is reliable for the AHI detection of user(s). Though the amplitude of respiratory signal is determine by the supine posture of user(s). However, the embodiment of the present disclosure renews the calculation of local threshold value 150-400 seconds there between. This method is reliably accurate in the detection of respiratory decrease, overcoming the change of body posture. Hence, the effect of the embodiment of the present disclosure is better than the traditional technology for detecting the sleep apnea event(s).

The embodiment of the present disclosure provides convenient, comfortable, and unconstrained monitoring, which is suitable for using at home. In particular, the high risk of cardiovascular disease and stroke has been proved that is related to severe sleep apnea. Patients with cardiovascular dysfunction and stroke usually have respiratory problems. The occurrence of CSA is related to ventricular arrhythmia, atrial arrhythmia and clinical outcome in patients with heart failure. The automatic filtering (screening) method and a system compatible with various types of sensors help early warning and prevent the deterioration of potentially life-threatening arrhythmias.

The response time period of different types of sensor are different. For example, the response time of thermal sensor is slower than the pressure sensor. The sleep medicine experts can consider the necessary respiratory signal thus to recognize the events may happen. However, this research quantifies the level of severity of sleep apnea via ratio of duration time of the respiratory decrease, and analyzes the respiratory signal individually. Therefore, the methods recited herein are less interfered by the response time.

In the existed technology, the automatic detection of occurrence of sleep apnea/hypopnea usually requires discriminant rules or internet environment. The quantification of respiratory signal provides an alternative method for estimating the sleep apnea, omitting the continuous detection of sleep apnea/hypopnea events. In the present article, it provides a holo-measurement which is based on the duration time as known as the percentage of sleep apnea. This new index considers the detection and the duration time of sleep apnea/hypopnea there between. On the other hand, the index also has marvelous potential and can be used as an index to evaluate the level of severity of sleep apnea. It is obvious in order to the strong fitness of the AHI estimated by sleep medicine experts.

The decrease of the respiratory fluctuation may be caused by different one who is under test or the variation of time. Therefore, here provides an adaptive, digital driven threshold for detecting the data segment of the decrease of the respiratory fluctuation in a short time period. The short period threshold is set from 150 to 400 seconds via the cross product of medium of respiratory fluctuation and the level of the whole respiratory fluctuation. The medium of respiratory fluctuation provides the basis of the short period threshold. In general, medium of the respiratory fluctuation data segment of normal breathing is larger than the data segment of sleep apnea. The difference between them can be optimized the cross of basic threshold and the level of the whole respiratory fluctuation. The level of the whole respiratory fluctuation mentioned here means the variation between 0 (Normal) and 1 (Sleep Apnea).

Figure 8:
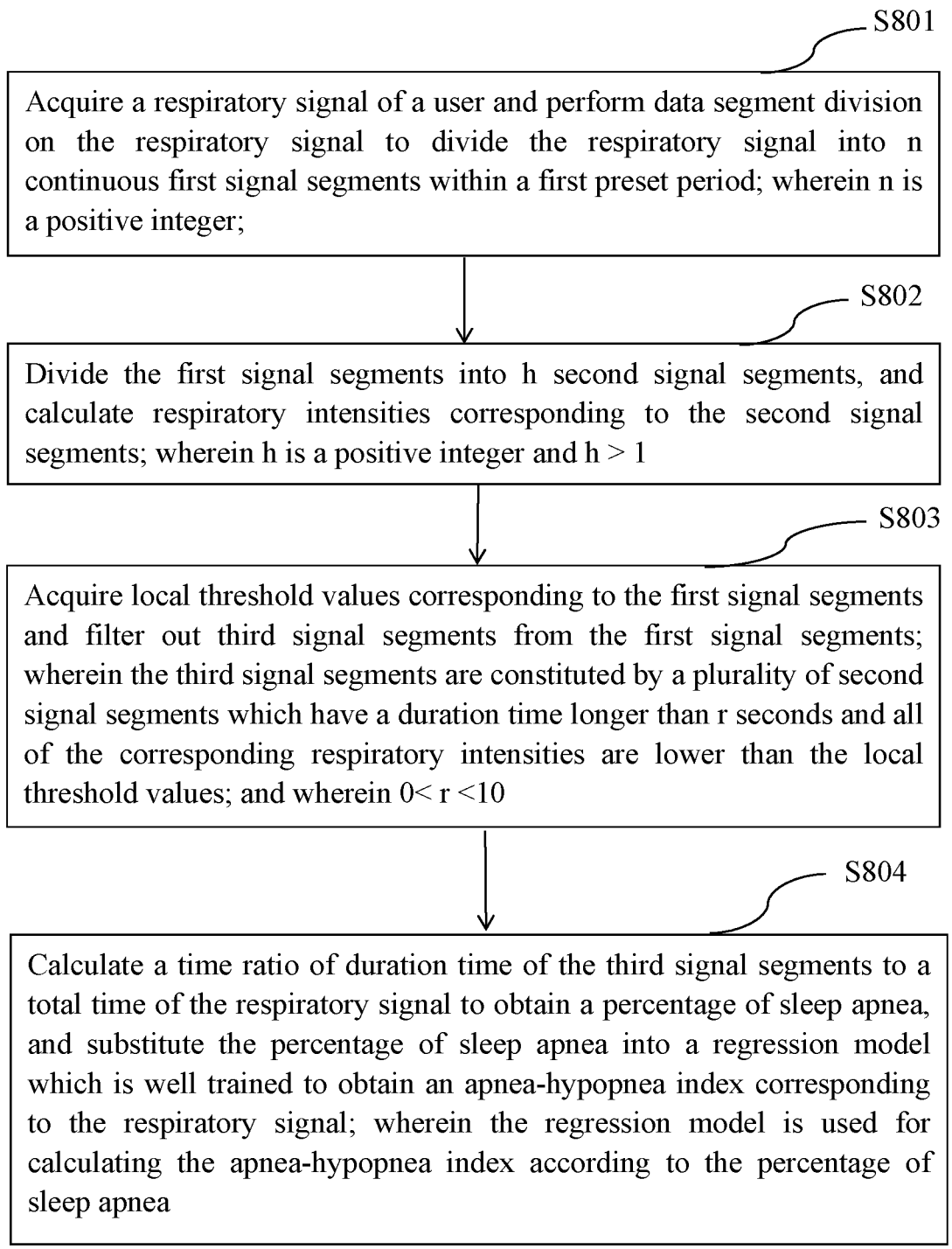
FIG. 8 is the method of detecting sleep apnea provided by eighth embodiment of the present disclosure.

Please refer to FIG. 8, this figure shows the method of detecting sleep apnea provided by eighth embodiment of the present disclosure as follows:

S801, acquire respiratory signal of during the sleep of the user and divide the respiratory signal into continuous first signal segments with number of n via data segments with a first preset period. The number of the first signal segments is n and n is a positive integer.

S802, divide the first signal segments into second signal segments with number of h, and calculate related respiratory intensities corresponding to the second signal segments. The h is a positive integer and h>1.

S803, acquire a local threshold value related to the first signal segments and filter out third signal segments which are constituted by the second signal segments. The duration time of the second signal segments is over r seconds and all of the related respiratory fluctuation is smaller than the local threshold value. The r is 0<r<10.

S804, calculate the duration time of the third signal segments and acquire the time ratio of the third signal segments of the respiratory signal, generating percentage of sleep apnea. The percentage of sleep apnea is substituted into a regression model which is well trained, acquiring an apnea-hypopnea index related to the respiratory signal. The regression model is used for matching the apnea-hypopnea index according to the percentage of sleep apnea.

As an implementable method for calculating the respiratory fluctuation of the eighth embodiment of the present disclosure, comprising:

The second signal segments are processed by using Empirical Mode Decomposition (EMD) and separated into a plurality of EMD functions.

Filtering out one or more EMD function(s) related to the user(s) via the plurality of EMD functions.

Calculate the related respiratory intensities corresponding to the second signal segments with number h via filtered one or more EMD function(s).

As an implementable method for calculating the suitable local threshold value via the real first signal segments of the eighth embodiment of the present disclosure, comprising:

Divide the respiratory signal into fourth signal segments with number of m via data segments with a second preset period. The first preset period is longer than the second preset period and the m is a positive integer.

As a suggested embodiment of the present disclosure, comprising: divide the respiratory signal into the fourth signal segments with number of m via s % overlapped data segment and terms of the second preset period. The value of s is 0<s<100.

Calculate the level of the whole respiratory fluctuation of the respiratory signal via the fourth signal segments with number of m.

As an implementable method for calculating the level of the whole respiratory fluctuation, comprising:

Calculate each fourth signal segment which is related to multiple respiratory fluctuations and filter out the medium of each respiratory fluctuation related to fourth signal segment.

Calculate the respiratory fluctuation related to each fourth signal segment via the medium of respiratory fluctuation with the number of m, and filter out the medium of the respiratory declination ratio with the number of m, acquiring the level of the whole respiratory fluctuation.

Calculate the local threshold value related to each first signal segment via the respiratory fluctuation which is related to every first signal segment with the number of h and level of whole respiratory fluctuation.

In fact, the cross product of the medium of the respiratory fluctuation which is related to every first signal segment with the number of h and the level of the whole respiratory fluctuation can be calculated, thus to acquire the local threshold value related to the first signal segment.

To realize the recognition of types of the sleep apnea, the respiratory signal of the embodiment of the present disclosure comprises:

Calculate the respiratory declination ratio which are related to head-neck motion signal and dorsal thoracic motion signal via the third signal segments which are related to the head-neck motion signal and dorsal thoracic motion signal.

The respiratory declination ratio based recognition of types of sleep apnea.

As one embodiment of the present disclosure, the respiratory signal is snout airflow signal, pleural cavity motion signal, head-neck motion signal, dorsal thoracic motion signal or one or more signal combinations thereof. In the embodiment of the present disclosure, it further comprises a contact sensor which is used for collecting the snout airflow signal and/or pleural cavity motion signal when the user is in sleep, and a non-contact sensor which is used for collecting the head-neck motion signal and/or dorsal thoracic motion signal when the user is in sleep.

As an embodiment of the present disclosure, it further comprises: output and display the AHI.

The eighth embodiment and the other executor of the detection of sleep apnea are the computer device which is related to sleep apnea detection system of the embodiment of the present disclosure (e.g. the first to fifth embodiments of the present disclosure). On the other hand, the theories of the methods of detection of sleep apnea are basically the same as the detection of sleep apnea of the computer device of the embodiments of the present disclosure. The descriptions of them are able to be referred above, and the further description is omitted.

Figure 9A:
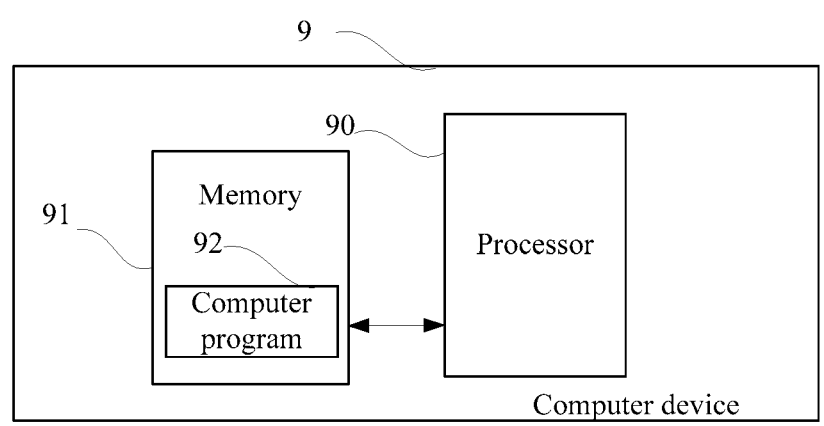
FIG. 9A is schematic diagram of the computer device provided by the ninth embodiment of the present disclosure.

FIG. 9A is schematic diagram of the computer device provided by the ninth embodiment of the present disclosure. As shown in FIG. 9A, the computer device 9 comprises processor 90 and storage medium 91. The storage medium 91 stores the computer-readable instructions 92 which is able to be executed by processor 90.

Figure 9B:
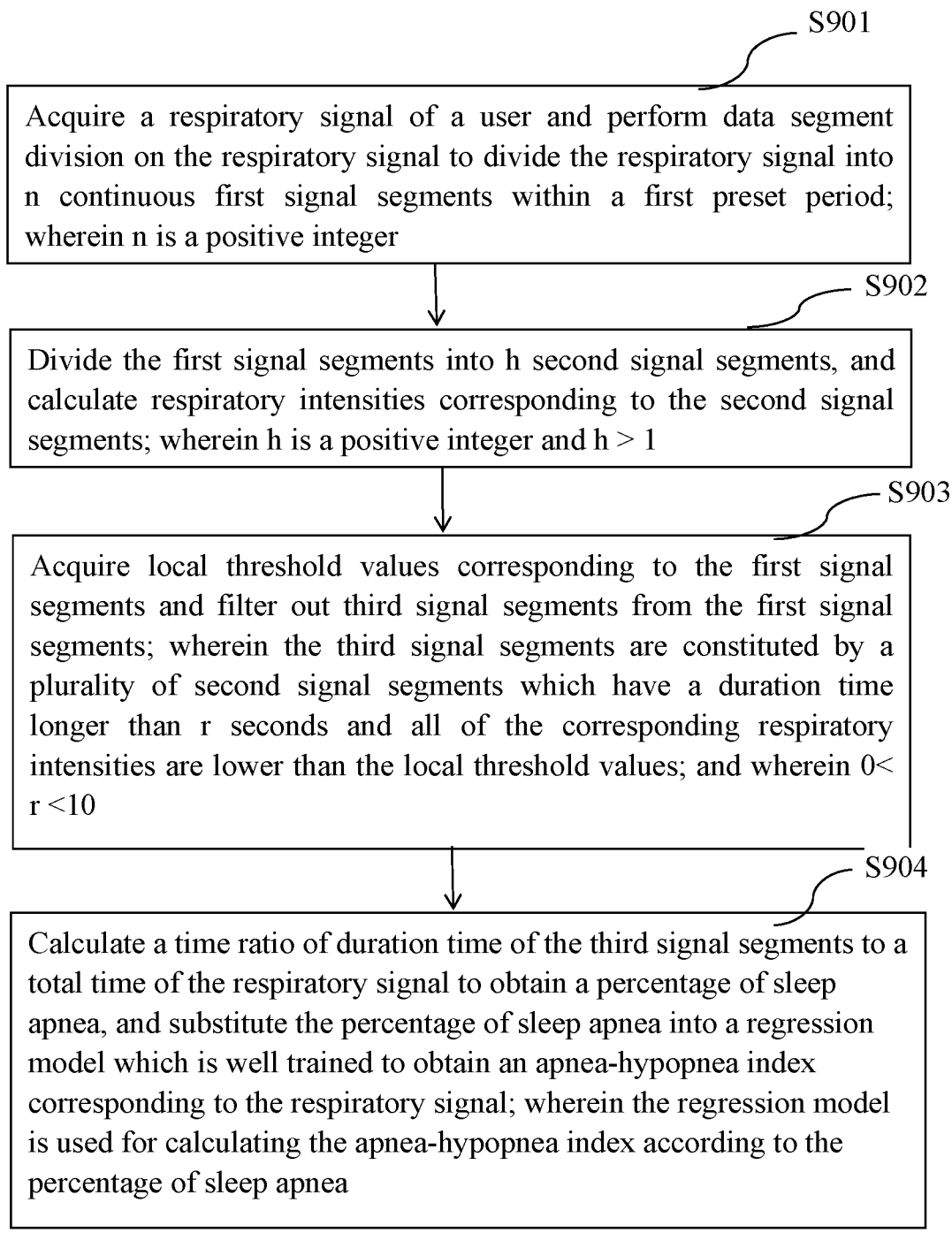
FIG. 9B is a flow chart shows the sleep apnea detection process of the computer device provided by the ninth embodiment of the present disclosure.

As shown in FIG. 9B. The processor 90 executes the computer-readable instructions 92 as the following steps:

S901, acquire respiratory signal of during the sleep of the user and divide the respiratory signal into continuous first signal segments with number of n via data segments with a first preset period. The number of the first signal segments is n and n is a positive integer.

S902, divide the first signal segments into second signal segments with number of h, and calculate related respiratory intensities corresponding to the second signal segments. The h is a positive integer and h>1.

S903, acquire a local threshold value related to the first signal segments and filter out third signal segments which are constituted by the second signal segments. The duration time of the second signal segments is over r seconds and all of the related respiratory fluctuation is smaller than the local threshold value. The r is (<r<10.

S904, calculate the duration time of the third signal segments and acquire the time ratio of the third signal segments of the respiratory signal, generating percentage of sleep apnea. The percentage of sleep apnea is substituted into a regression model which is well trained, acquiring an apnea-hypopnea index related to the respiratory signal. The regression model is used for matching the apnea-hypopnea index according to the percentage of sleep apnea.

As an implementable embodiment of the ninth embodiment of the present disclosure for calculating the respiratory fluctuation, comprising:

The second signal segments are processed by using Empirical Mode Decomposition (EMD) and separated into a plurality of EMD functions.
Filter out one or more EMD function(s) related to the user via the plurality of EMD functions.
Calculate the related respiratory intensities corresponding to the second signal segments with number h via filtered one or more EMD function(s).

As an implementable method for calculating the suitable local threshold value via the real first signal segments of the ninth embodiment of the present disclosure, comprising:

Divide the respiratory signal into fourth signal segments with number of m via data segments with a second preset period. The first preset period is longer than the second preset period and the m is a positive integer.

As a suggested embodiment of the present disclosure, comprising: divide the respiratory signal into the fourth signal segments with number of m via s % overlapped data segment and terms of the second preset period. The value of s is 0<s<100.

Calculate the level of the whole respiratory fluctuation of the respiratory signal via the fourth signal segments with number of m.

As an implementable method for calculating the level of the whole respiratory fluctuation, comprising:

Calculate each fourth signal segment which is related to multiple respiratory fluctuations and filter out the medium of each respiratory fluctuation related to fourth signal segment.

Calculate the respiratory fluctuation related to each fourth signal segment via the medium of respiratory fluctuation with the number of m, and filter out the medium of the respiratory declination ratio with the number of m, acquiring the level of the whole respiratory fluctuation.

Calculate the local threshold value related to each first signal segment via the respiratory fluctuation which is related to every first signal segment with the number of h and level of whole respiratory fluctuation.

In fact, the cross product of the medium of the respiratory fluctuation which is related to every first signal segment with the number of h and level of whole respiratory fluctuation can be calculated, thus to acquire the local threshold value related to the first signal segment.

To realize the recognition of types of the sleep apnea, the respiratory signal of the embodiment of the present disclosure comprises:

Calculate the respiratory declination ratio which are related to head-neck motion signal and dorsal thoracic motion signal via the third signal segments which are related to the head-neck motion signal and dorsal thoracic motion signal.

The respiratory declination ratio based recognition of types of sleep apnea.

As one embodiment of the present disclosure, the respiratory signal is snout airflow signal, pleural cavity motion signal, head-neck motion signal, dorsal thoracic motion signal or one or more signal combinations thereof. In the embodiment of the present disclosure, it further comprises a contact sensor which is used for collecting the snout airflow signal and/or pleural cavity motion signal when the user is in sleep, and a non-contact sensor which is used for collecting the head-neck motion signal and/or dorsal thoracic motion signal when the user is in sleep.

As an embodiment of the present disclosure, it further comprises: output and display the AHI.

The ninth embodiment and the other executor of the detection of sleep apnea are the computer device which is related to sleep apnea detection system of the embodiment of the present disclosure (e.g. the first to fifth embodiments of the present disclosure). On the other hand, the theories of the methods of detection of sleep apnea are basically the same as the detection of sleep apnea of the computer device of the embodiments of the present disclosure. The descriptions of them are able to be referred above, and the further description is omitted.

The calculation device 9 is able to be desktop computers, notebooks, mobile terminals, PDA, cloud servers or the other devices with data computing and processing functions. The computer device 9 may comprise but not limited to processor 90 and storage medium 91. The skilled person in the art can understand that the FIG. 9A is just an example for computer device 9 and it fails to limit the components of computer device 9. The actual computer device 9 can comprise more or less components/units or further integrated by the other or different components such is the input/output equipment, network access equipment or bus.

The processor 90 is able to be central processing unit (CPU) or the other general-purpose processor, digital signal processor such as Digital Signal Processor (DSP), Application Specific Integrated Circuit (ASIC), Field-Programmable Gate Array (FPGA), programmable logic devices, discrete gates, transistor logic devices or discrete hardware components.

The storage medium 91 can be the internal storage unit of the computer device 9. For example, the hard disk or memory which are configured on computer device 9. Storage medium 91 can also be an external storage device of computer device 9. For example, the plug-in hard drive equipped on computer device 9, Smart Media Card (SMC), Secure Digital (SD) card or Flash Card. Furthermore, the storage medium 91 may also include an internal storage unit of the computer device 9 or an external storage device. Storage medium 91 is used for storing other programs or data required by computer-readable instructions 92 and computer device 9. Storage medium 91 can also be used to temporarily store data that has been sent or will be sent.

The computer device of the sleep apnea detection system recited in the first to fifth embodiment of the present disclosure or the other embodiments, and the function or hardware comprised by the computer device shall be able to be changed. For example, the built-in components such as sensors or display can be configured and integrated with the computer device, improving the calculation ability of local threshold value. Those variations shall be inside the scope of the present disclosure.

Please understand that the order of numbers recited in the abovementioned embodiments do not means the absolute order of the embodiment of the present disclosure. The functions or logic of each step should be concerned. There is no limitation to the embodiment of the present disclosure.

It should also be understood that although the terms "first" and "second" are used for describing various elements in the embodiment of the present disclosure. However, these elements should not be restricted by these terms. These terms are only used for distinguishing one element from the other. For example, the first table can be named the second table; in the same way, the second table can also be named as the first table. As long as the various descriptions or the scope of the embodiments are not violated, the first table and the second table are both tables. It is just that they are not the same table.

In addition, the functional units in the embodiments of the present disclosure may be integrated into one processing unit. It may also be that each unit physically exists alone, or two or more units are integrated into a single unit. The abovementioned integrated unit can be implemented in the form of hardware or software functional units.

If the integrated module/unit is implemented in the form of a software functional unit and sold or used as an independent product, it can be stored in a computer readable storage medium. This application implements all or part of the processes in the above-mentioned embodiment methods, and can also be completed by instructing relevant hardware through computer-readable instructions. The computer-readable instructions can be stored in a computer-readable storage medium. When the computer-readable instructions are executed by the processor, the steps of the foregoing method of embodiments can be executed reliably. The computer-readable instructions include computer-readable code. The computer-readable code may be in source code form, object code form, executable file or some intermediate form. The computer-readable medium may include any entity or device which is capable of storing computer-readable code. For example, the computer-readable medium may be recording media, U disks, mobile hard drives, magnetic disks, optical disks, computer memory, Read-Only Memory (ROM), Random Access Memory (RAM), electrical carrier signals, telecommunications signals, and software distribution media.

As understood by a person skilled in the art, the foregoing preferred embodiments of the present disclosure are illustrated of the present disclosure rather than limitations of the present disclosure. It is intended to cover various modifications and similar arrangements included within the spirit and scope of the appended claims, the scope of which should be accorded the broadest interpretation to encompass all such modifications and similar structures. While the preferred embodiment of the invention has been illustrated and described above, it will be appreciated that various changes can be made therein without departing from the spirit and scope of the present disclosure.

What is claimed is:

1. A sleep apnea detection system, comprising:
   a computer device comprising: a contact sensor or a non-contact sensor;
   wherein the computer device is configured to:
   collect a respiratory signal of a user who is in sleep through the contact sensor or the non-contact sensor, and perform data segment division on the respiratory signal to divide the respiratory signal into n continuous first signal segments within a first preset period; wherein n is a positive integer;
   divide each of the first signal segments into h second signal segments, and calculate h respiratory intensities corresponding to the h second signal segments; wherein h is positive integer, and h>1;
   obtain a local threshold value corresponding to each of the first signal segments and filter out a third signal segment from each of the first signal segments; wherein the third signal segment is consisted of multiple second signal segments from the h second signal segments, the multiple second signal segments each has a duration time longer than r seconds and a corresponding respiratory intensity being lower than the local threshold value; and wherein 0<r<10;
   calculate a time ratio of total duration time of all third signal segments to a total time of the respiratory signal to obtain a percentage of sleep apnea; and
   substitute the percentage of sleep apnea into a pre-established regression model to obtain an apnea-hypopnea index corresponding to the respiratory signal;
   wherein the regression model is used for calculating the apnea-hypopnea index according to the percentage of sleep apnea;
   wherein the computer device is further configured to send the apnea-hypopnea index to a smart phone of the user to be checked and printed;
   wherein the respiratory therapy system is connected to respiratory treatment equipment, the computer device is further configured to, when detecting that the apnea-hypopnea index is higher, cause the respiratory treatment equipment to be activated,
   wherein the contact sensor or the non-contact sensor is a wearable device that integrates a sensing head, a microprocessor and a communication circuit,
   wherein the computer device is configured to obtain the local threshold value corresponding to each of the first signal segments by:

performing data segment division on the respiratory signal to divide the respiratory signal into m fourth signal segments within a second preset period; wherein the first preset period is longer than the second preset period, and m is a positive integer;

calculating a plurality of respiratory intensities corresponding to each of the m fourth signal segments and filtering out m mediums of the plurality of respiratory intensities corresponding to the m fourth signal segments;

calculating m respiration declination ratios corresponding to the m fourth signal segments based on the obtained m mediums of the respiratory intensities and m minimums of the plurality of respiratory intensities, and filtering out a medium of the m respiration declination ratios, and taking the medium of the m respiratory declination ratios as the whole respiratory fluctuation degree of the respiratory signal, wherein a respiratory declination ratio is a ratio of a difference between a medium and a minimum of the plurality of respiratory intensities corresponding to each of the m fourth signal segments to the medium of the plurality of respiratory intensities corresponding to each of the m fourth signal segments; and calculating the local threshold value corresponding to each of the first signal segments based on h respiratory intensities corresponding to each of the first signal segments and the whole respiratory fluctuation degree.

2. The sleep apnea detection system according to claim 1, wherein the computer device is configured to calculate the h respiratory fluctuations corresponding to the h second signal segments by:

dividing the h second signal segments into a plurality of EMD functions using Empirical Mode Decomposition (EMD);

filtering out one or a plurality of EMD function(s) related to the user from the plurality of EMD functions; and calculating the respiratory intensities corresponding to the h second signal segments based on the filtered one or plurality of EMD function(s).

3. The sleep apnea detection system according to claim 1, wherein the computer device is configured to perform the data segment division on the respiratory signal to divide the respiratory signal into the m fourth signal segments within the second preset period by:

performing data segment division on the respiratory signal to divide the respiratory signal into the m fourth signal segments according to an overlap proportion of s % within the second preset period; wherein 0≤s<100.

4. The sleep apnea detection system according to claim 1, wherein the computer device is configured to calculate the local threshold value corresponding to each of the first signal segments based on the h respiratory intensities corresponding to each of the first signal segments and the whole respiratory fluctuation degree by:

calculating a cross product of the medium of the h respiratory intensities corresponding to each of the first signal segments and the whole respiratory fluctuation degree corresponding to each of the first signal segments to obtain the local threshold value corresponding to each of the first signal segments.

5. The sleep apnea detection system according to claim 1, wherein the respiratory signal is a snout airflow signal, a pleural cavity motion signal, a head-neck motion signal, a dorsal thoracic motion signal or any one or the combinations thereof;

the contact sensor is configured to collect the snout airflow signal and/or the pleural cavity motion signal when the user is in sleep;

the non-contact sensor is configured to collect the head-neck motion signal and/or dorsal thoracic motion signal when the user is in sleep.

6. The sleep apnea detection system according to claim 1, wherein the respiratory signal is a snout airflow signal, a pleural cavity motion signal, a head-neck motion signal, a dorsal thoracic motion signal, or one or the combination of the snout airflow signal, the pleural cavity motion signal, the head-neck motion signal, and the dorsal thoracic motion signal;

the contact sensor is configured to collect the snout airflow signal and/or the pleural cavity motion signal when the user is in sleep and send the snout airflow signal and/or pleural cavity motion signal to the computer device; and the non-contact sensor is configured to collect the head-neck motion signal and/or the dorsal thoracic motion signal when the user is in sleep and send the head-neck motion signal and/or the dorsal thoracic motion signal to the computer device.

7. The sleep apnea detection system according to claim 1, wherein the sleep apnea detection system further comprises a display, the computer device is configured to send the apnea-hypopnea index to the display;

and the display is configured to output and display the apnea-hypopnea index received from the computer device.

8. The sleep apnea detection system according to claim 1, wherein the computer device further comprises a display configured to output and display the apnea-hypopnea index.

9. The sleep apnea detection system according to claim 1, wherein the respiratory signal comprises: a head-neck motion signal and a dorsal thoracic motion signal;

the computer device is configured to:

calculate respiratory declination ratios corresponding to the head-neck motion signal and the dorsal thoracic motion signal based on the all third signal segments corresponding to the head-neck motion signal and the dorsal thoracic motion signal; and detect a type of sleep apnea of the user.

10. A computer device of a respiratory therapy system, comprising a memory and a processor;

the memory stores computer-readable instruction a computer command executable on the processor, wherein when executing the computer command, the processor is configured to execute the computer-readable instruction so as to perform following steps of:

acquiring a respiratory signal of a user through a contact sensor or a non-contact sensor and performing data segment division on the respiratory signal to divide the respiratory signal into n continuous first signal segments within a first preset period; wherein n is a positive integer;

dividing each of the first signal segments into h second signal segments, and calculating respiratory intensities corresponding to the h second signal segments; wherein h is a positive integer and h>1;

acquiring a local threshold value corresponding to each of the first signal segments and filtering out a third signal segment from each of the first signal segments; wherein the third signal segment is consisted of multiple second signal segments from the h second signal segments, wherein the multiple second signal segments each has a duration time longer than r seconds and a corresponding respiratory intensity being lower than the local threshold value; and wherein 0<r<10;

calculating a time ratio of duration time of all third signal segments to a total time of the respiratory signal to obtain a percentage of sleep apnea, and substituting the percentage of sleep apnea into a pre-established regression model to obtain an apnea-hypopnea index corresponding to the respiratory signal;

wherein the regression model is used for calculating the apnea-hypopnea index according to the percentage of sleep apnea;

sending the apnea-hypopnea index to a smart phone of the user to be checked and printed; and activating respiratory treatment equipment connected to the respiratory therapy system, when detecting that the apnea-hypopnea index is higher, wherein the contact sensor or the non-contact sensor is a wearable device that integrates a sensing head, a microprocessor and a communication circuit, wherein said acquiring the local threshold value corresponding to each of the first signal segments comprises:

performing data segment division on the respiratory signal to divide the respiratory signal into m fourth signal segments within a second preset period; wherein the first preset period is longer than the second preset period, and m is positive integer;

calculating a plurality of respiratory intensities corresponding to each of the m fourth signal segments and filtering out m mediums of the respiratory intensities corresponding to the m fourth signal segments;

calculating m respiration declination ratios corresponding to the m fourth signal segments based on the obtained m mediums of the respiratory intensities and m minimums of the plurality of respiratory intensities, and filtering out a medium of the m respiration declination ratios, and taking the medium of the m respiratory declination ratios as the whole respiratory fluctuation degree of the respiratory signal, wherein a respiratory declination ratio is a ratio of a difference between a medium and a minimum of the plurality of respiratory intensities corresponding to each of the m fourth signal segments to the medium of the plurality of respiratory intensities corresponding to each of the m fourth signal segments; and calculating the local threshold value corresponding to each of the first signal segments based on the h respiratory intensities corresponding to each of the first signal segments and the whole respiratory fluctuation degree.

11. The computer device according to claim 10, wherein the respiratory signal is a snout airflow signal, a pleural cavity motion signal, a head-neck motion signal, a dorsal thoracic motion signal or one or the combination of the snout airflow signal, the pleural cavity motion signal, the head-neck motion signal, and the dorsal thoracic motion signal;

wherein said acquiring the respiratory signal of the user when the user is in sleep through the contact sensor or the non-contact sensor comprises:

controlling the contact sensor to collect the snout airflow signal and/or the pleural cavity motion signal when the user is in sleep; or controlling the non-contact sensor to collect the head-neck motion signal and/or dorsal thoracic motion signal when the user is in sleep.

12. The computer device according to claim 10, wherein said calculating the local threshold value corresponding to each of the first signal segments based on the h respiratory intensities corresponding to each of the first signal segments and the whole respiratory fluctuation degree comprises:

calculating a cross product of the medium of the h respiratory intensities corresponding to each of the first signal segments and the whole respiratory fluctuation degree corresponding to the first signal segments to obtain the local threshold value corresponding to each of the first signal segments.

13. A non-transitory computer-readable storage medium which stores a computer-readable instruction, that, when being executed by a processor, causes the processor to perform following steps of:

pre-establishing a regression model;

acquiring a respiratory signal of a user and performing data segment division on the respiratory signal to divide the respiratory signal into n continuous first signal segments within a first preset period; wherein n is a positive integer;

dividing each of the first signal segments into h second signal segments, and calculating h respiratory intensities corresponding to the h second signal segments; wherein h is a positive integer and h>1;

acquiring a local threshold value corresponding to each of the first signal segments and filtering out a third signal segment from each of the first signal segments; wherein the third signal segment is consisted of multiple second signal segments from the h second signal segments, wherein the multiple second signal segments each has a duration time longer than r seconds and a corresponding respiratory intensity being lower than the local threshold value; and wherein 0<r<10;

calculating a time ratio of total duration time of all third signal segments to a total time of the respiratory signal to obtain a percentage of sleep apnea, and substituting the percentage of sleep apnea into the pre-established regression model to obtain an apnea-hypopnea index corresponding to the respiratory signal;

wherein the regression model is used for calculating the apnea-hypopnea index according to the percentage of sleep apnea;

sending the apnea-hypopnea index to a smart phone of the user to be checked and printed; and activating respiratory treatment equipment connected to the respiratory therapy system, when detecting that the apnea-hypopnea index is higher, wherein the contact sensor or the non-contact sensor is a wearable device that integrates a sensing head, a microprocessor and a communication circuit, wherein said acquiring the local threshold value corresponding to each of the first signal segments comprises:

performing data segment division on the respiratory signal to divide the respiratory signal into m fourth signal segments within a second preset period; wherein the first preset period is longer than the second preset period, and m is positive integer;

calculating a plurality of respiratory intensities corresponding to each of the m fourth signal segments and filtering out m mediums of the respiratory intensities corresponding to the m fourth signal segments;

calculating m respiration declination ratios corresponding to the m fourth signal segments based on the obtained m mediums of the respiratory intensities and m minimums of the plurality of respiratory intensities, and filtering out a medium of the m respiration declination ratios, and taking the medium of the m respiratory declination ratios as the whole respiratory fluctuation degree of the respiratory signal, wherein a respiratory declination ratio is a ratio of a difference between a medium and a minimum of the plurality of respiratory intensities corresponding to each of the m fourth signal segments to the medium of the plurality of respiratory intensities corresponding to each of the m fourth signal segments; and calculating the local threshold value corresponding to each of the first signal segments based on the h respiratory intensities corresponding to each of the first signal segments and the whole respiratory fluctuation degree.

\* \* \* \* \*